(12) United States Patent
Ou et al.

(10) Patent No.: US 12,147,460 B2
(45) Date of Patent: Nov. 19, 2024

(54) METHOD AND APPARATUS FOR TRAINING DIALOG MODEL, COMPUTER DEVICE, AND STORAGE MEDIUM

(71) Applicant: Tencent Technology (Shenzhen) Company Limited, Shenzhen (CN)

(72) Inventors: Jiao Ou, Shenzhen (CN); Jinchao Zhang, Shenzhen (CN); Yang Feng, Shenzhen (CN); Fandong Meng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 428 days.

(21) Appl. No.: 17/715,778

(22) Filed: Apr. 7, 2022

(65) Prior Publication Data

US 2022/0309088 A1     Sep. 29, 2022

Related U.S. Application Data

(63) Continuation of application No. PCT/CN2021/091954, filed on May 6, 2021.

(30) Foreign Application Priority Data

May 25, 2020   (CN) .......................... 202010450194.0

(51) Int. Cl.
*G06F 40/30*      (2020.01)
*G06F 16/33*      (2019.01)
(Continued)

(52) U.S. Cl.
CPC ...... *G06F 16/3329* (2019.01); *G06F 16/3344* (2019.01); *G06N 7/01* (2023.01); *G06F 40/30* (2020.01)

(58) Field of Classification Search
CPC ........................................................ G06F 40/30
See application file for complete search history.

(56) References Cited

U.S. PATENT DOCUMENTS

| 10,303,978 B1 | 5/2019 | Kang et al. |
| 2020/0104670 A1 | 4/2020 | Seo et al. |

(Continued)

FOREIGN PATENT DOCUMENTS

| CN | 108022589 A | 5/2018 |
| CN | 108897797 A | 11/2018 |

(Continued)

OTHER PUBLICATIONS

Tencent Technology, Japanese Office Action, JP Patent Application No. 2022-538829, Jun. 26, 2023, 17 pgs.

(Continued)

*Primary Examiner* — Feng-Tzer Tzeng
(74) *Attorney, Agent, or Firm* — Morgan, Lewis & Bockius LLP

(57) ABSTRACT

A computer device acquires, based on a prior network and a posterior network of a dialogue model, at least two first dialogue features and at least two second dialogue features of a first dialogue. The computer device outputs, using the prior network, a probability distribution of dialogue features in accordance with the acquired dialogue features and estimates, using the posterior network, the probability distribution of the dialogue features output by the prior network. The computer device updates the dialogue model and updates the posterior network based on dialogue features of the first dialogue. The computer device also updates a discriminator in the dialogue model based on at least two first dialogue features and at least two second dialogue features of a second dialogue. In accordance with a determination that the dialogue model has satisfied a training end condition, the (Continued)

computer device determines that the dialogue model is a trained model.

20 Claims, 7 Drawing Sheets

(51) Int. Cl.
 *G06F 16/332* (2019.01)
 *G06N 7/01* (2023.01)

(56) References Cited

U.S. PATENT DOCUMENTS

| | | | |
|---|---|---|---|
| 2020/0226475 A1* | 7/2020 | Ma | G06F 40/30 |
| 2020/0372351 A1* | 11/2020 | Chang | G06F 18/24 |
| 2021/0397797 A1 | 12/2021 | Li et al. | |

FOREIGN PATENT DOCUMENTS

| | | |
|---|---|---|
| CN | 110457457 A | 11/2019 |
| CN | 111680123 A | 9/2020 |
| EP | 3454260 A1 | 2/2018 |
| JP | 2019049957 A | 3/2019 |
| JP | 2020030403 A | 2/2020 |

OTHER PUBLICATIONS

Tencent Technology, Japanese Office Action, JP 2022-538829, Oct. 10, 2023, 6 pgs.
Tencent Technology, WO, PCT/CN2021/091954, Aug. 4, 2021, 5 pgs.
Tencent Technology, IPRP, PCT/CN2021/091954, Nov. 17, 2022, 6 pgs.
Tencent Technology, ISR, PCT/CN2021/091954, Aug. 4, 2021, 2 pgs.
Hareesh Bahuleyan et al., "StochasticWasserstein Autoencoder for Probabilistic Sentence Generation", NAACL-HLT 2019, 9 pgs., Retrieved from the Internet: https://arxiv.org/pdf/1806.08462.pdf.

* cited by examiner

METHOD AND APPARATUS FOR TRAINING DIALOG MODEL, COMPUTER DEVICE, AND STORAGE MEDIUM

CROSS-REFERENCE TO RELATED APPLICATIONS

This application is a continuation application of PCT Patent Application No. PCT/CN2021/091954, entitled "DIALOGUE MODEL TRAINING METHOD AND APPARATUS, COMPUTER DEVICE, AND STORAGE MEDIUM" filed on May 6, 2021, which claims priority to Chinese Patent Application No. 202010450194.0, filed with the State Intellectual Property Office of the People's Republic of China on May 25, 2020, and entitled "METHOD AND APPARATUS FOR TRAINING DIALOG MODEL, COMPUTER DEVICE, AND STORAGE MEDIUM", all of which are incorporated herein by reference in their entirety.

FIELD OF THE TECHNOLOGY

This application relates to the technical field of artificial intelligence (AI), and in particular, to a method for training a dialogue model, a method for generating a dialogue reply, an apparatus, a computer device, and a storage medium.

BACKGROUND OF THE DISCLOSURE

With the development of AI technologies, natural language processing (NLP) can be applied in a wider range, such as chatbots, dialogue systems, conversational systems, terminal intelligent assistants, and other human-computer interaction scenarios. A computer device may output a corresponding dialogue reply based on a dialogue preceding text input by a user during a dialogue. How to avoid too monotonous dialogue replies output by the computer device is a problem to be solved.

SUMMARY

Embodiments of this application provide a method for training a dialogue model, a method for generating a dialogue reply, an apparatus, a computer device, and a non-transitory computer-readable storage medium. By updating a parameter of a dialogue model repeatedly according to dialogue features of a dialogue and considering different semantics of the dialogue, a dialogue reply contains multiple semantics, and the diversity of the dialogue reply generated by the dialogue model is improved. The technical solution is as follows:

In one aspect, a method for training a dialogue model that includes a prior network and a posterior network is provided, including:

acquiring, based on the prior network and the posterior network, at least two first dialogue features and at least two second dialogue features of a first dialogue, wherein (1) the first dialogue features represent posterior features of a first dialogue preceding text and a first dialogue reply in the first dialogue; (2) the second dialogue features represent prior features of the first dialogue preceding text and the first dialogue reply in the first dialogue; and (3) the first dialogue includes the first dialogue preceding text and at least two first dialogue replies; outputting, using the prior network, a probability distribution of dialogue features in accordance with the acquired dialogue features; estimating, using the posterior network, the probability distribution of the dialogue features output by the prior network in a dialogue model, the probability distribution of the dialogue features output by the prior network;

updating the dialogue model based on the at least two first dialogue features and the at least two second dialogue features of the first dialogue;

updating the posterior network based on the at least two first dialogue features of the first dialogue;

updating a discriminator in the dialogue model based on at least two first dialogue features and at least two second dialogue features of a second dialogue; and in accordance with a determination that the dialogue model has satisfied a training end condition, determining that the dialogue model is a trained model.

In another aspect, a method for generating a dialogue reply is provided, including:

acquiring a dialogue preceding text;

inputting the dialogue preceding text into a dialogue model, and randomly extracting a target dialogue feature from second dialogue features corresponding to a plurality of dialogue replies based on a prior network in the dialogue model;

decoding the target dialogue feature based on a decoder in the dialogue model, and outputting a target dialogue reply; and presenting the target dialogue reply.

In another aspect, an apparatus (e.g., a computer device or a computer system) for training a dialogue model is provided, including:

a feature acquisition module, configured to acquire at least two first dialogue features and at least two second dialogue features of a first dialogue based on a prior network for outputting a probability distribution of dialogue features and a posterior network for estimating the probability distribution of the dialogue features output by the prior network in a dialogue model, the first dialogue features representing posterior features of a dialogue preceding text and a dialogue reply in a dialogue, the second dialogue features representing prior features of a dialogue preceding text and a dialogue reply in a dialogue, and the first dialogue including a first dialogue preceding text and at least two first dialogue replies;

a model update module, configured to update the dialogue model based on the at least two first dialogue features and the at least two second dialogue features of the first dialogue, the model update module being further configured to update the posterior network based on the at least two first dialogue features of the first dialogue, and the model update module being further configured to update a discriminator in the dialogue model based on at least two first dialogue features and at least two second dialogue features of a second dialogue; and a model acquisition module, configured to take a trained model as the dialogue model in response to satisfying a training end condition.

In another aspect, an apparatus (e.g., a computer device or a computer system) for generating a dialogue reply is provided, including:

a dialogue acquisition module, configured to acquire a dialogue preceding text;

a feature extraction module, configured to input the dialogue preceding text into a dialogue model, and randomly extract a target dialogue feature from first dialogue features corresponding to a plurality of dialogue replies based on a prior network in the dialogue model;

a reply output module, configured to decode the target dialogue feature based on a decoder in the dialogue model, and output a target dialogue reply; and a reply presentation module, configured to present the target dialogue reply.

In another aspect, a computer device is provided. The computer device includes a processor and a memory for storing at least one piece of program code loaded and executed by the processor to implement operations executed in the method for training a dialogue model in the embodiments of this application or to implement operations executed in the method for generating a dialogue reply in the embodiments of this application.

In another aspect, a storage medium is provided. The storage medium stores at least one piece of program code for executing the method for training a dialogue model in the embodiments of this application or executing the method for generating a dialogue reply in the embodiments of this application.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show only some embodiments of this application, and a person of ordinary skill in the art may still derive other accompanying drawings from the accompanying drawings without creative efforts.

DESCRIPTION OF EMBODIMENTS

Figure 1:
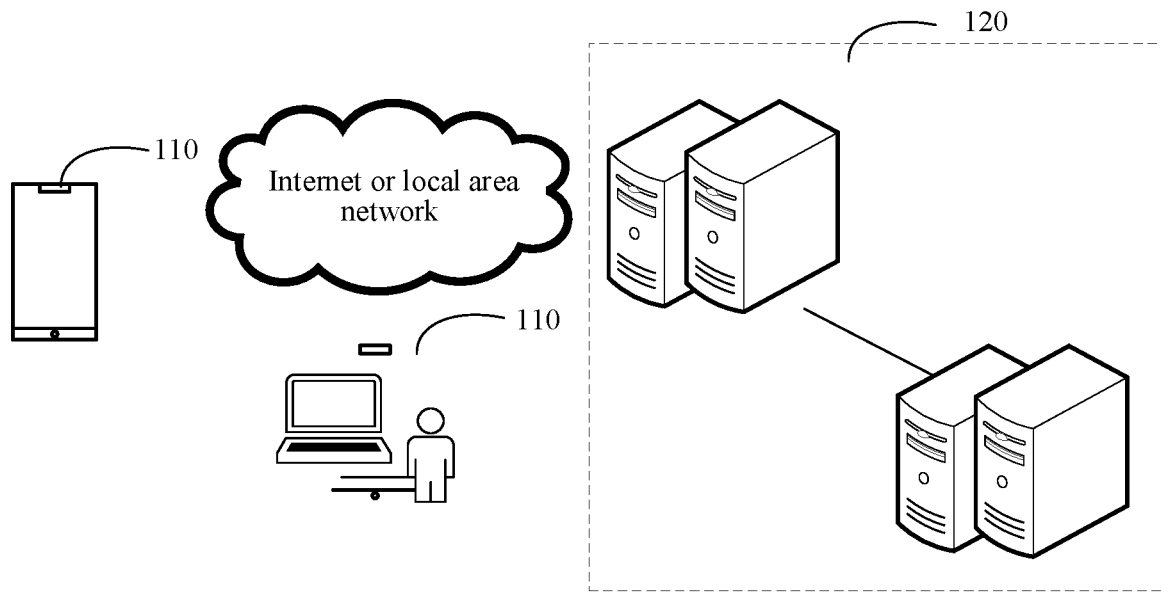
FIG. 1 is a schematic diagram of an implementation environment of a method for training a dialogue model according to an embodiment of this application.

To make the objectives, technical solutions, and advantages of this application clearer, the following further describes implementations of this application in detail with reference to the accompanying drawings.

The exemplary embodiments are described herein in detail, and examples of the embodiments are shown in the accompanying drawings. When the following description involves the accompanying drawings, unless otherwise indicated, the same numerals in different accompanying drawings represent the same or similar elements. The implementations described in the following exemplary embodiments do not represent all implementations that are consistent with this application. On the contrary, the implementations are merely examples of apparatuses and methods that are described in detail in the appended claims and that are consistent with some aspects of this application.

The following briefly describes technologies that may be used in the embodiments of this application:

Artificial intelligence (AI) is a theory, method, technology, and application system that uses a digital computer or a machine controlled by the digital computer to simulate, extend, and expand human intelligence, perceive an environment, obtain knowledge, and use knowledge to obtain an optimal result. In other words, AI is a comprehensive technology of computer sciences, attempts to understand essence of intelligence, and produces a new intelligent machine that can react in a manner similar to human intelligence. The AI is to study the design principles and implementation methods of various intelligent machines, to enable the machines to have the functions of perception, reasoning, and decision-making.

An AI cloud service, also commonly referred to as AI as a service (AIaaS). This service is a service mode of a current mainstream AI platform. Specifically, an AIaaS platform will split several types of common AI services and provide independent or packaged services in the cloud. This service mode is similar to opening an AI theme store: all developers may access one or more AI services provided by using the platform by means of an API interface, and some senior developers may also use an AI framework and AI infrastructure provided by the platform to deploy and maintain their own proprietary cloud AI services.

Natural language processing (NLP) is an important direction in the field of computer technologies and the field of AI. NLP studies various theories and methods for implementing effective communication between human and computers through natural languages. NLP is a science that integrates linguistics, computer science and mathematics. Therefore, studies in this field relate to natural languages, that is, languages used by people in daily life, and NLP is closely related to linguistic studies. The NLP technology generally includes technologies such as text processing, semantic understanding, machine translation, robot question and answer, and knowledge graph.

Machine learning (ML) is a multi-disciplinary subject involving a plurality of disciplines such as probability theory, statistics, approximation theory, convex analysis, and algorithm complexity theory. The ML specializes in studying how a computer simulates or implements a human learning behavior to obtain new knowledge or skills, and reorganize an existing knowledge structure, so as to keep improving performance of the computer. The ML is the core of the AI, is a basic way to make the computer intelligent, and is applied to various fields of AI. The ML and deep learning generally include technologies such as an artificial neural network, a belief network, reinforcement learning, transfer learning, inductive learning, and learning from demonstrations.

Embodiments of this application provide a method for training a dialogue model (e.g., a conversational model), which may be implemented based on an AI technology. A dialogue model trained by this method may be applied to a human-computer interaction scenario, such as a chatbot, a dialogue system and a terminal intelligent assistant. When a user is chatting with the chatbot, the chatbot may input the content input by the user as a dialogue preceding text into the dialogue model, and the dialogue model outputs a plurality of dialogue replies and then presents one of the dialogue replies to the user. Similarly, the dialogue system and the terminal intelligent assistant may also output dialogue replies meeting the requirements of the user according to the content input by the user.

An implementation environment of a method for training a dialogue model is described below. FIG. 1 is a schematic diagram of an implementation environment of a method for training a dialogue model according to an embodiment of this application. The implementation environment may include: a terminal 110 and a server 120.

The terminal 110 and the server 120 may be directly or indirectly connected by means of wired or wireless communication, and this application is not limited thereto. The terminal 110 may be, but is not limited to, a smartphone, a pad, a laptop, a desktop, a smart speaker, a smart watch, etc. The terminal 110 may be installed and run with applications that support human-computer interaction. The applications may be chatbot applications, social applications, terminal intelligent assistant applications, etc. Illustratively, the terminal 110 is a terminal used by a user, and a user account is logged in an application running in the terminal 110.

The server 120 may be an independent physical server, may also be a server cluster or distributed system composed of a plurality of physical servers, and may also be a cloud server providing basic cloud computing services, such as a cloud service, a cloud database, cloud computing, a cloud function, cloud storage, a network service, cloud communication, a middleware service, a domain name service, a security service, a CDN, and a large data and AI platform. The server 120 is configured to provide background services for applications that support human-computer interaction. In some embodiments, the server 120 undertakes primary model training tasks, and the terminal 110 undertakes secondary model training tasks. Alternatively, the server 120 undertakes secondary model training tasks, and the terminal 110 undertakes primary model training tasks. Alternatively, the server 120 or the terminal 110 may undertake model training tasks alone respectively.

In some embodiments, the server 120 may be composed of an access server, a model training server and a database server. The access server is configured to provide access services to the terminal 110. The model training server is configured to perform model training based on authorized dialogue data provided by the terminal. There may be one or more model training servers. When there are more model training servers, at least two model training servers are configured to provide different services, and/or, at least two model training servers are configured to provide the same service, e.g., in a load balancing manner. This is not limited by the embodiments of this application.

The terminal 110 may generally refer to one of a plurality of terminals, and the present embodiment is illustrated with the terminal 110 only.

A person skilled in the art may appreciate that there may be more or fewer terminals. For example, there may be only one terminal described above, or there may be several tens or several hundreds, or more terminals described above, and other terminals are also included in the embodiments of the above method for training a dialogue model. The quantity and the device type of the terminals are not limited in the embodiments of this application.

Figure 2:
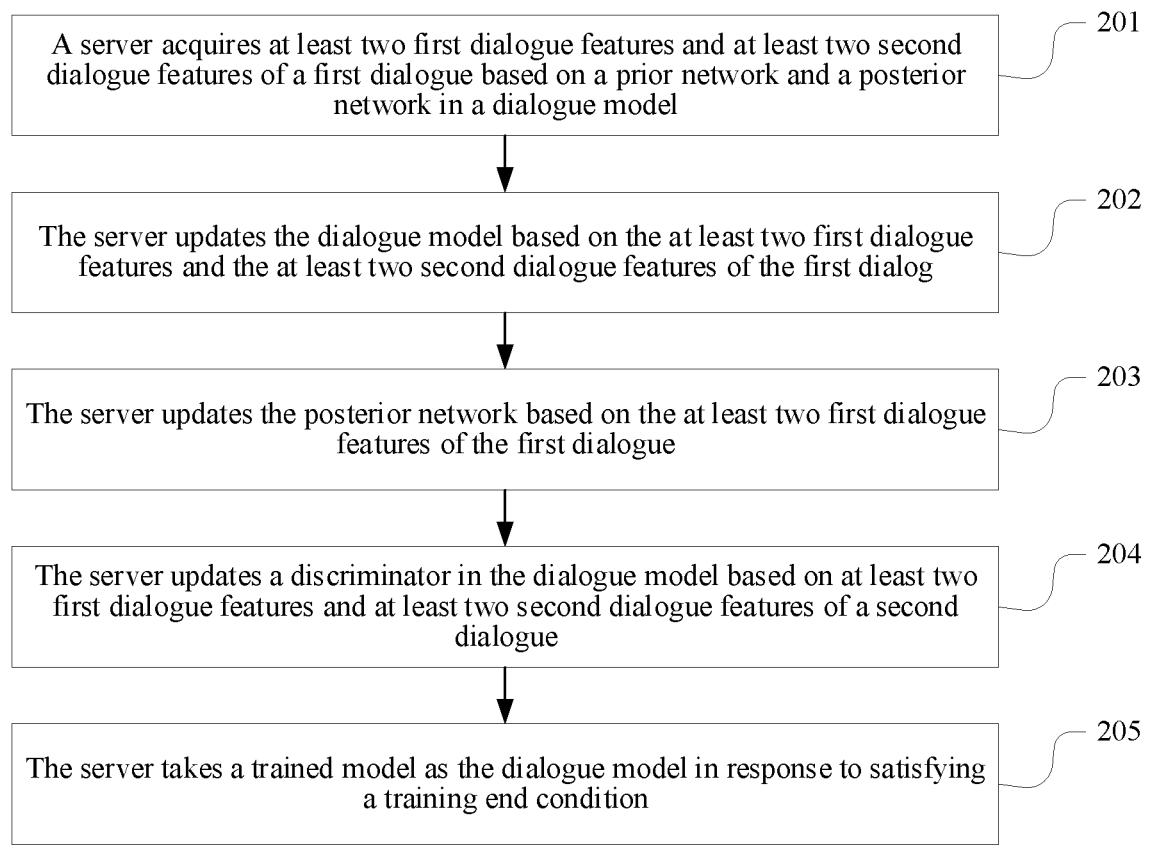
FIG. 2 is a flowchart of a method for training a dialogue model according to an embodiment of this application.

In the embodiments of this application, a technical solution provided in the embodiments of this application may be implemented by a server or a terminal as an executive body, and a technical method provided in this application may also be implemented by interaction between the terminal and the server. This is not limited by the embodiments of this application. FIG. 2 is a flowchart of a method for training a dialogue model according to an embodiment of this application. This embodiment is illustrated by taking a server as an executive body. Referring to FIG. 2, this embodiment includes the following steps:

201: The server acquires at least two first dialogue features and at least two second dialogue features of a first dialogue based on a prior network and a prior network in a dialogue model. The prior network is used for outputting a probability distribution of dialogue features. The posterior network is used for estimating the probability distribution of the dialogue features output by the prior network in the dialogue model. The first dialogue features represent posterior features of a dialogue preceding text and a dialogue reply in a dialogue, the second dialogue features represent prior features of a dialogue preceding text and a dialogue reply in a dialogue, and the first dialogue includes a first dialogue preceding text and at least two first dialogue replies. In step 201, the server acquires at least two first dialogue features and at least two second dialogue features of a first dialogue. The first dialogue features and the second dialogue features represent posterior features and prior features of a first dialogue preceding text and a first dialogue reply respectively. One dialogue preceding text corresponds to at least two dialogue replies.

In the embodiments of this application, the server may select a dialogue from a plurality of dialogues as a first dialogue, and the first dialogue includes a first dialogue preceding text and at least two first dialogue replies corresponding to the first dialogue preceding text. For any group of first dialogue preceding texts and first dialogue replies, the server may acquire corresponding prior and posterior features through a prior network and a posterior network respectively.

202: The server updates a dialogue model based on the at least two first dialogue features and the at least two second dialogue features of the first dialogue.

In the embodiments of this application, the server may acquire at least one dialogue feature and at least two second dialogue features of the first dialogue. The first dialogue preceding text and a first dialogue reply in the first dialogue may obtain a first dialogue feature and a second dialogue feature, the dialogue model is updated once according to the first dialogue feature and the second dialogue feature, and parameters of the prior network and the posterior network in the dialogue model are updated. Another first dialogue feature and another second dialogue feature are obtained according to the first dialogue preceding text and another first dialogue reply in the first dialogue, and the dialogue model is updated once more. The number of updates for the dialogue model is the same as the number of first dialogue replies contained in the first dialogue.

The dialogue model may further include an encoder, a decoder and a discriminator. In some embodiments, the server updates parameters of the encoder, the decoder and the discriminator while updating the parameters of the prior network and the posterior network.

203: The server updates the posterior network based on the at least two first dialogue features of the first dialogue.

In some embodiments of this application, the server may acquire at least two second dialogue features of the first dialogue and then update the parameter of the posterior network once based on each second dialogue feature.

204: The server updates a discriminator in the dialogue model based on at least two first dialogue features and at least two second dialogue features of a second dialogue.

The second dialogue includes one second dialogue preceding text and at least two second dialogue replies.

In some embodiments of this application, the server selects at least one dialogue from a plurality of dialogues as a second dialogue. For any second dialogue, the server may acquire at least two first dialogue features and at least two second dialogue features of the second dialogue according to the manner described in step 201. A first dialogue feature and a second dialogue feature may be obtained according to a second dialogue preceding text and a second dialogue reply of any one second dialogue, and the parameter of the discriminator is updated once based on the first dialogue feature and the second dialogue feature. At this moment, the number of updates for the discriminator is the number of second dialogue replies contained in the second dialogue.

The above process illustrates only one iteration process of the discriminator. In some embodiments, the server may acquire a threshold of iterations of the discriminator, perform multiple iterations according to the threshold of iterations and end the training when the threshold of iterations is reached.

205: The server takes a trained model as the dialogue model in response to satisfying a training end condition.

In the embodiments of this application, the training end condition may be that a predetermined number of iterations is reached, or the model converges, or a result output by the model meets a target condition or meets other training end conditions, etc. This is not limited by the embodiments of this application.

In the embodiments of this application, a dialogue model is updated repeatedly by means of a plurality of dialogue features of a first dialogue, and a posterior network is updated again. Then, a discriminator of the dialogue model is updated according to a plurality of dialogue features of a second dialogue. Different semantics of a dialogue can be considered, so that a dialogue reply contains multiple semantics, thereby improving the performance of the dialogue model and also improving the diversity of the dialogue reply generated by the dialogue model.

Figure 3:
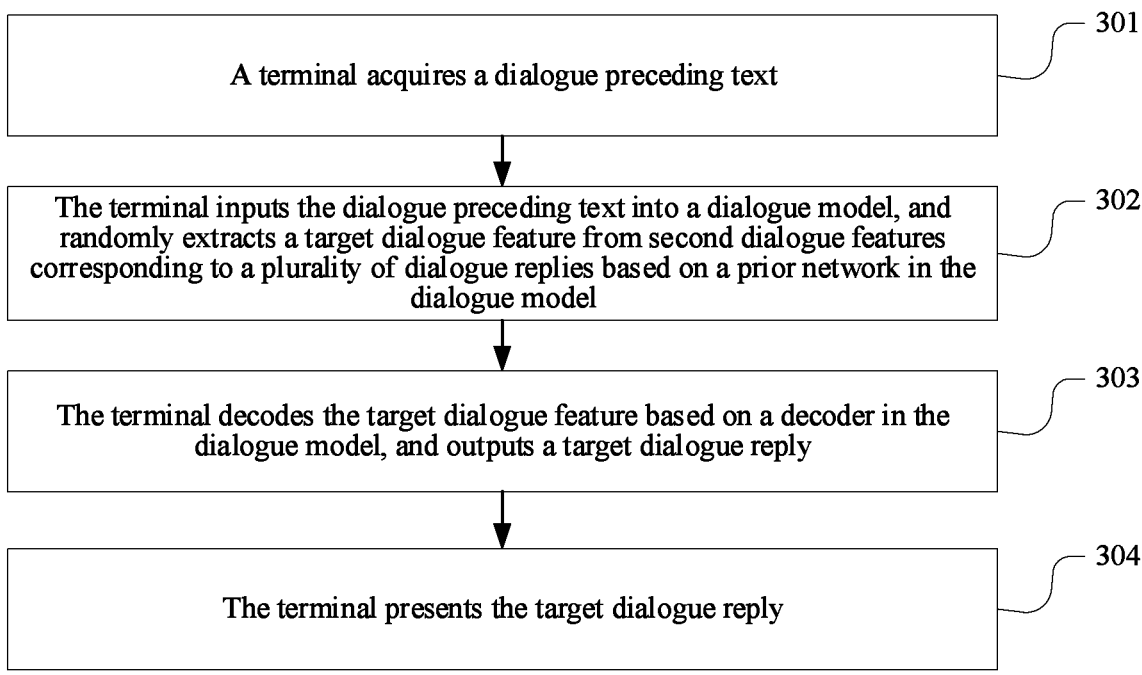
FIG. 3 is a flowchart of a method for generating a dialogue reply according to an embodiment of this application.

In the embodiments of this application, a technical solution provided in the embodiments of this application may be implemented by a server or a terminal as an executive body, and a technical method provided in this application may also be implemented by interaction between the terminal and the server. This is not limited by the embodiments of this application. FIG. 3 is a flowchart of a method for generating a dialogue reply according to an embodiment of this application. This embodiment is illustrated by taking a terminal as an executive body. Referring to FIG. 3, this embodiment includes the following steps:

301: The terminal acquires a dialogue preceding text.

In the embodiments of this application, the dialogue preceding text may be content input by a terminal user, such as text, speech or emoji.

302: The terminal inputs the dialogue preceding text into a dialogue model, and randomly extracts a target dialogue feature from second dialogue features corresponding to a plurality of dialogue replies based on a prior network in the dialogue model.

In the embodiments of this application, the terminal may be provided with a dialogue model. Content input by a user, as a dialogue preceding text, is input into the dialogue model, and the input dialogue preceding text is encoded by the dialogue model. Features obtained by encoding are input into a prior network in the dialogue model, and a target dialogue feature is randomly extracted from a plurality of first dialogue features based on the prior network. Due to the random extraction, when the terminal re-inputs the dialogue preceding text, the dialogue features extracted by the prior network may be different from the last extracted dialogue features, so that dialogue replies output by the dialogue model are different.

303: The terminal decodes the target dialogue feature based on a decoder in the dialogue model, and outputs a target dialogue reply.

In the embodiments of this application, a decoder in the dialogue model may decode the target dialogue feature extracted randomly to obtain a target dialogue reply. If dialogue features randomly extracted by the prior network are different, dialogue replies decoded by the decoder are different.

304: The terminal presents the target dialogue reply.

In the embodiments of this application, the terminal may present the above target dialogue reply by means of voice playing (e.g., an audio or verbal output), text displaying (e.g., text output) or presenting a corresponding emoji.

In the embodiments of this application, a dialogue reply corresponding to a dialogue preceding text is acquired by means of random extraction, so that if the same dialogue preceding text is input into a dialogue model repeatedly, different dialogue replies may be obtained, thereby improving the diversity of dialogue replies.

The terminal acquires and outputs a dialogue reply through the self-configured dialogue model during the above interaction through the dialogue model. In some embodiments, the terminal may acquire a dialogue reply through a dialogue model configured on a server, and output the acquired dialogue reply, so as to achieve the effect of human-computer dialogues.

Figure 4:
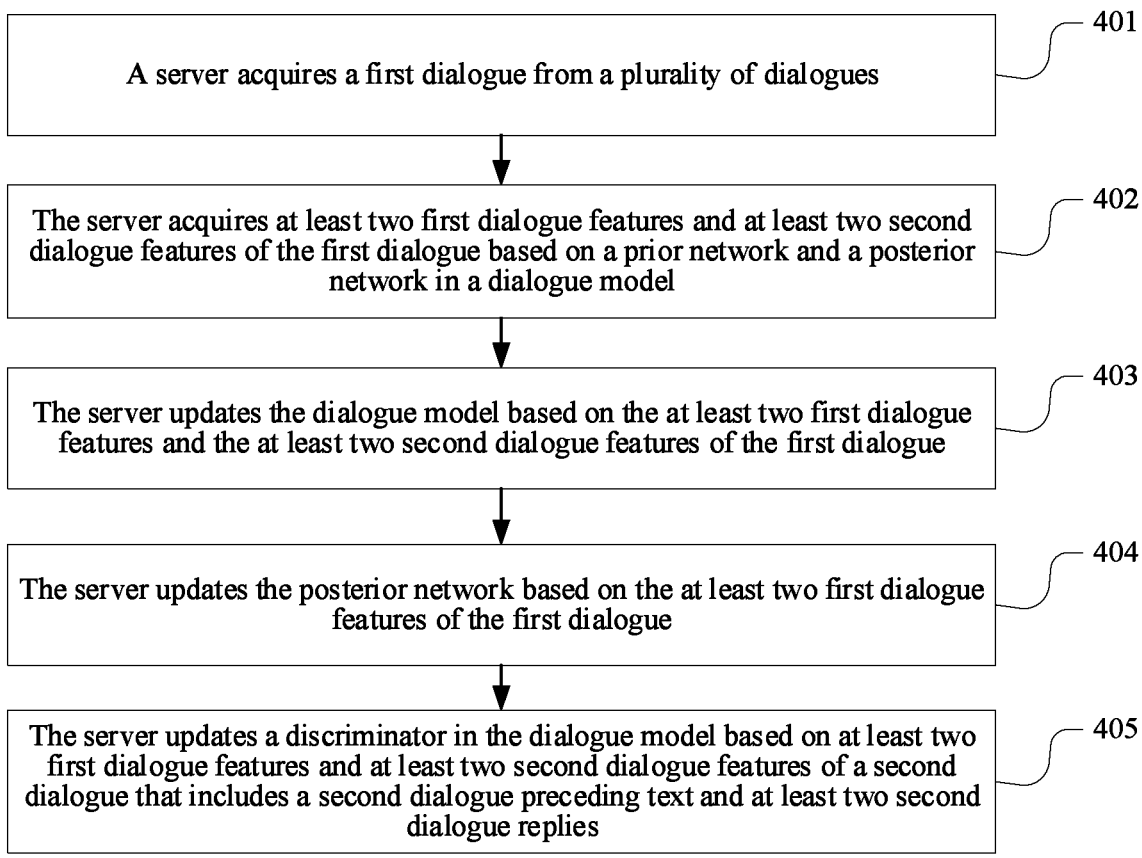
FIG. 4 is a flowchart of a method for training a dialogue model according to an embodiment of this application.

In the embodiments of this application, a technical solution provided in the embodiments of this application may be implemented by a server or a terminal as an executive body, and a technical method provided in this application may also be implemented by interaction between the terminal and the server. This is not limited by the embodiments of this application. FIG. 4 is a flowchart of a method for training a dialogue model according to an embodiment of this application. This embodiment is illustrated by one iteration of a server. Referring to FIG. 4, this embodiment includes the following steps:

401: The server acquires a first dialogue from a plurality of dialogues.

In the embodiments of this application, the server may randomly select N dialogues from a plurality of dialogues as first dialogues, where N is a positive integer (e.g., N is greater than or equal to one). For any first dialogue, the first dialogue includes a first dialogue preceding text and K first dialogue replies corresponding to the first dialogue preceding text, where K is a positive integer greater than or equal to 2. Different first dialogues may include the same or different numbers of first dialogue replies.

For example, a data set includes 1000 dialogues from which the server randomly selects 10 dialogues as first dialogues A, B, C, D, E, F, G, H, I, and J. The first dialogue A corresponds to 5 first dialogue replies a1, a2, a3, a4, and a5, the first dialogue B corresponds to 6 first dialogue replies b1, b2, b3, b4, b5, and b6, and the first dialogue C corresponds to 5 first dialogue replies c1, c2, c3, c4, c5, and c6. Enumeration will be omitted herein.

402: The server acquires at least two first dialogue features and at least two second dialogue features of a first dialogue based on a prior network and a posterior network in a dialogue model. The first dialogue features represent posterior features of a dialogue preceding text and a dialogue reply in a dialogue, the second dialogue features represent prior features of a dialogue preceding text and a dialogue reply in a dialogue, and the first dialogue includes a first dialogue preceding text and at least two first dialogue replies.

In the embodiments of this application, if at least two first dialogue replies are included in a first dialogue, at least 2N first dialogue replies are included in N first dialogues. For any first dialogue reply, the server may encode the first dialogue reply and a corresponding first dialogue preceding text, and then respectively input vector representations obtained by encoding into the prior network and the posterior network to obtain prior features and posterior features, i.e. second dialogue features and first dialogue features.

A first dialogue is taken as an example. For each first dialogue reply included in the first dialogue, the server may acquire a pair of first dialogue feature and second dialogue feature, e.g., a first dialogue feature and a second dialogue feature, based on the posterior network and the prior network. Accordingly, the step of acquiring, by the server, at least two first dialogue features and at least two second dialogue features of a first dialogue may be implemented by the following sub-steps 4021 to 4023.

4021: The server respectively encodes, for any of the first dialogue replies of the first dialogue, the first dialogue preceding text and the first dialogue reply based on an encoder of the dialogue model to obtain a first vector of the first dialogue preceding text and a second vector of the first dialogue reply.

In the embodiments of this application, the server respectively inputs the first dialogue preceding text and the first dialogue reply into an encoder of the dialogue model. The encoder is constructed based on a bidirectional gated circulation unit neural network (e.g., the encoder uses a bidirectional gated recurrent neural network (RNN)). The server encodes the first dialogue preceding text and the first dialogue reply according to the encoder to obtain, respectively, a first vector of the first dialogue preceding text and a second vector of the first dialogue reply.

The encoder encodes all the inputs, such as the first dialogue preceding text and the first dialogue reply, through the bidirectional gated circulation unit neural network, and the vector obtained by encoding is a vector with a fixed length. For example, it is illustrated by encoding a first dialogue preceding text $\mathcal{C}$ to obtain a first vector c. The first vector c is calculated by the following equations (1) to (4).

$$\vec{h}_t = GRU(\vec{h}_{t-1}, e(\mathcal{C}_t)) \tag{1}$$

where $\vec{h}_t$ represents a vector representation of a $t^{th}$ word from the left of the first dialogue preceding text $\mathcal{C}$, GRU( ) represents a gated circulation unit, $\vec{h}_{t-1}$ represents a vector representation of a t-$1^{th}$ word from the left of the first dialogue preceding text $\mathcal{C}$, and e($\mathcal{C}_t$) represents encoding corresponding to the $t^{th}$ word from the left of the first dialogue preceding text $\mathcal{C}$.

$$\overleftarrow{h}_t = GRU(\overleftarrow{h}_{t+1}, e(\mathcal{C}_t)) \tag{2}$$

where $\overleftarrow{h}_t$ represents a vector representation of a $t^{th}$ word from the right of the first dialogue preceding text $\mathcal{C}$, GRU( ) represents a gated circulation unit, $\overleftarrow{h}_{t+1}$ represents a vector representation of a t+$1^{th}$ word from the right of the first dialogue preceding text $\mathcal{C}$, and e($\mathcal{C}_t$) represents encoding corresponding to the $t^{th}$ word from the right of the first dialogue preceding text $\mathcal{C}$.

$$h_t = [\vec{h}_t; \overleftarrow{h}_t] \tag{3}$$

where $h_t$ represents a concatenation vector of the vector representation of the $t^{th}$ word from the left of the first dialogue preceding text $\mathcal{C}$ and the vector representation of the $t^{th}$ word from the right of the first dialogue preceding text $\mathcal{C}$.

$$c = [\vec{h}_T; \overleftarrow{h}_1] \tag{4}$$

where c represents a concatenation vector of a vector representation of a $T^{th}$ word from the left of the first dialogue preceding text $\mathcal{C}$ and a vector representation of a $1^{st}$ word from the right of the first dialogue preceding text $\mathcal{C}$, and T represents the number of words included in the first dialogue preceding text $\mathcal{C}$.

4022: The server acquires at least two first dialogue features of the first dialogue, and the first dialogue features of the first dialogue are obtained by processing the first vector of the first dialogue preceding text and the second vector of the first dialogue reply through the posterior network.

In step 4022, the server acquires a first dialogue feature based on the posterior network according to the first vector of the first dialogue preceding text and the second vector.

In some embodiments of this application, the posterior network is configured to learn the distribution of dialogue features of a dialogue based on a dialogue preceding text and a dialogue reply, and the distribution of dialogue features in a trained dialogue model may be more accurate according to reply information. A probability distribution of dialogue features output by the posterior network is referred to as a posterior distribution for estimating a prior distribution, i.e., a probability distribution of dialogue features output by the prior network.

In some embodiments, assuming that a dialogue reply currently needing to be reconstructed is a first dialogue reply, the posterior distribution has a normal distribution. Accordingly, the step of acquiring, by the server, a first dialogue feature based on the posterior network according to the first vector and the second vector may be that: the server may acquire a first parameter average and a first parameter variance of the posterior distribution according to the first vector of the first dialogue preceding text and the second vector of the first dialogue reply based on the posterior network. The server may acquire a first dialogue feature according to the first parameter average, the first parameter variance and a first sampling value. The first sampling value is a value sampled from a standard normal distribution, i.e., a value of a sampling point. Since a first dialogue feature is obtained by a value sampled from a standard normal distribution, a dialogue reply is reconstructed by the decoder based on the first dialogue feature during training, and a parameter of the dialogue model is adjusted based on a difference between the reconstructed dialogue reply and the first dialogue reply, so that the difference between the first dialogue feature and the first dialogue reply is small, and the first dialogue feature may be used to represent the first dialogue reply.

The first dialogue feature is calculated by the server based on the posterior network through the following equations (5) and (6).

$$\begin{bmatrix} \mu_k \\ \sigma_k \end{bmatrix} = W g_\phi([x_k, c]) + b, \tag{5}$$

where $\mu_k$ represents a first parameter average, $\sigma_k$ represents a first parameter variance, W represents a variable parameter, $g_\phi(\ )$ represents a posterior network, $x_k$ represents a second vector of a first dialogue reply, c represents a first vector of a first dialogue preceding text, and b represents an offset parameter.

$$z_k = \mu_k + \sigma_k * \epsilon, \epsilon \sim \mathcal{N}(0, I) \tag{6}$$

where $z_k$ represents a first dialogue feature, $\mu_k$ represents a first parameter average, $\sigma_k$ represents a first parameter variance, $\epsilon$ represents a first sampling value, and $\epsilon \sim \mathcal{N}(0, I)$ represents $\epsilon$ obeying a standard normal distribution.

4023: The server may acquire a second dialogue feature based on the prior network according to the first vector and a reply category to which the first dialogue reply belongs. The reply category includes at least one another dialogue reply belonging to the same category as the first dialogue reply.

In some embodiments of this application, the prior network is configured to represent a real probability distribution of dialogue features, obtained from posterior distribution estimation. When the prior distribution is estimated by the posterior distribution, a sub-distribution is selected from the prior distribution to match the posterior distribution. In order to be able to exactly match the posterior distribution and the prior distribution, at least two dialogue replies corresponding to one dialogue preceding text may be clustered to obtain a plurality of reply categories. Then, when acquiring a second dialogue feature, a sub-distribution in the prior distribution is selected according to the reply category to which the first dialogue reply belongs.

In some embodiments, assuming that the prior distribution obeys a Gaussian mixture, the server selects a sub-distribution according to the reply category to which the first dialogue reply belongs, and then samples a second dialogue feature from the sub-distribution. Accordingly, the step of acquiring, by the server, a second dialogue feature based on the prior network according to the first vector and a reply category to which the first dialogue reply belongs may be that: the server may determine a target probability distribution according to the first vector and the reply category to which the first dialogue reply belongs. The target probability distribution is a probability distribution corresponding to the reply category in the probability distribution of dialogue features output by the prior network, i.e., a sub-distribution for matching with the posterior distribution. The server may acquire a second parameter average and a second parameter variance based on the prior network according to the first vector. The server may acquire a second dialogue feature according to the second parameter average, the second parameter variance and a second sampling value. The second sampling value is a value sampled from a target probability distribution, i.e., a value of a sampling point. Since a second dialogue feature is acquired by a sampling value on a sub-distribution in a Gaussian mixture distribution, a Wasserstein distance between the prior distribution and the posterior distribution is acquired based on the encoder according to the second dialogue feature and the first dialogue feature during training, thereby accurately matching the prior distribution and the posterior distribution.

The second dialogue feature may be calculated by the server based on the prior network through the following equations (7) to (9).

$$\tilde{z} \sim p(\tilde{z} \mid c) = \sum_{j=0}^{J} \pi_j \mathcal{N}(\tilde{z} \mid \tilde{\mu}_j, \tilde{\sigma}_j^2 I) \quad \pi_j = \begin{cases} 1, & \text{if } T_k \text{ belongs to a reply category } j \\ 0, & \text{otherwise} \end{cases}, \tag{7}$$

where $\tilde{z}$ represents a second dialogue feature, $\tilde{z} \sim p(\tilde{z}|c)$ represents a second dialogue feature obeying a prior distribution, j represents an identity of a reply category, J represents a total number of reply categories, $\pi_j$ represents a sub-distribution selection parameter, $r_k$ represents a $k^{th}$ dialogue reply, and $\mathcal{N}(\tilde{z}|\tilde{\mu}_j, \tilde{\sigma}_j^2 I)$ represents a prior distribution.

$$\begin{bmatrix} \tilde{\mu}_j \\ \tilde{\sigma}_j \end{bmatrix} = \tilde{W}_j f_\theta(c) + \tilde{b}_j, \tag{8}$$

where $\tilde{\mu}_j$ represents a second parameter average of a target probability distribution corresponding to a reply category j, $\tilde{\sigma}_j$ represents a second parameter variance of the target probability distribution corresponding to the reply category j, $\tilde{W}$ represents a variable parameter of the target probability distribution corresponding to the reply category j, $f_\theta(\ )$ represents a prior network, c represents a first vector of a first dialogue preceding text, and $\tilde{b}_j$ represents an offset parameter of the target probability distribution corresponding to the reply category j.

$$\tilde{z} = \tilde{\mu}_j + \tilde{\sigma}_j * \tilde{\epsilon}, \tilde{\epsilon} \sim \mathcal{N}(0, I) \tag{9}$$

where $\tilde{z}$ represents a second dialogue feature, $\tilde{\mu}_j$ represents a second parameter average of the target probability distribution corresponding to the reply category j, $\tilde{\sigma}_j$ represents a second parameter variance of the target probability distribution corresponding to the reply category j, $\tilde{\epsilon}$ represents a second sampling value, and $\tilde{\epsilon} \sim \mathcal{N}(0, I)$ represents $\tilde{\epsilon}$ obeying a standard normal distribution.

For any first dialogue, at least two posterior distributions may be obtained according to the first dialogue including at least two dialogue replies, and a first dialogue feature $z_k$ may be sampled from each posterior distribution. A prior distribution may be obtained according to a dialogue preceding text included in the first dialogue. The prior distribution includes at least two sub-distributions, and a second dialogue feature $\tilde{z}$ may be sampled from each sub-distribution. That is, for the same first dialogue, the obtained at least two second dialogue features $\tilde{z}$ are from the same prior distribution.

403: The server updates a dialogue model based on the at least two first dialogue features and the at least two second dialogue features of the first dialogue.

In the embodiments of this application, for any first dialogue reply, the server may acquire a first dialogue feature and a second dialogue feature corresponding to the first dialogue reply. The server may acquire a discriminator loss and a reconstruction loss according to the first vector obtained by encoding the first dialogue preceding text, and the first and second dialogue features corresponding to the first dialogue reply. The server may then update parameters of the posterior network and the prior network in the dialogue model according to the discriminator loss and update parameters of the encoder, the posterior network, the prior network, and the decoder in the dialogue model according to the reconstruction loss. Finally, the server may update a parameter of the discriminator of the dialogue model according to the discriminator loss.

The discriminator loss is obtained by optimizing the Wasserstein distance between the posterior distribution and the prior distribution by an adversarial network. The server acquires a first Wasserstein distance between the first dialogue feature and the second dialogue feature based on the discriminator of the dialogue model according to the first vector of the first dialogue preceding text and the first and second dialogue features corresponding to the first dialogue reply, and takes the first Wasserstein distance as a discriminator loss. Accordingly, the discriminator loss may be calculated by equation (10).

$$\mathcal{L}_{disc} = E_{z_k \sim q_\phi(z_k|c, x_k)}[D(z_k, c)] - E_{\tilde{z} \sim p_\theta(\tilde{z}|c)}[D(\tilde{z}, c)] \quad (10),$$

where $\mathcal{L}_{disc}$ represents a discriminator loss, $E_{z_k \sim q_\phi(z_k|c, x_k)}$ represents a mathematical expectation of a first dialogue feature $z_k$, $D(\ )$ represents a discriminator, $z_k$ represents a first dialogue feature, c represents a first vector of a first dialogue preceding text, $E_{\tilde{z} \sim p_\theta(\tilde{z}|c)}$ represents a mathematical expectation of a second dialogue feature $\tilde{z}$, and $\tilde{z}$ represents a second dialogue feature.

Accordingly, when the server updates the parameter of the prior network in the dialogue model according to the discriminator loss, the parameter may be calculated by equation (11).

$$\theta_{P-net} = \theta_{P-net} - lr * \frac{\partial}{\partial \theta_{P-net}} \mathcal{L}_{disc}, \quad (11)$$

where $\theta_{P-net}$ represents a parameter of a prior network, lr represents a learning rate of a dialogue model, $\partial$ represents a derivation, and $\mathcal{L}_{disc}$ represents a discriminator loss.

Accordingly, the server updates the parameter of the posterior network in the dialogue model according to the discriminator loss, and the parameter of the posterior model is calculated by equation (12).

$$\theta_{R-net} = \theta_{R-net} - lr * \frac{\partial}{\partial \theta_{R-net}} \mathcal{L}_{disc}, \quad (12)$$

where $\theta_{R-net}$ represents a parameter of a posterior network, lr represents a learning rate of a dialogue model, $\partial$ represents a derivation, and $\mathcal{L}_{disc}$ represents a discriminator loss.

The first dialogue feature sampled on the posterior distribution may be decoded based on the decoder to reconstruct a dialogue reply, and a reconstruction loss may be determined based on an error between the reconstructed dialogue reply and the first dialogue reply. The server may decode the first dialogue feature based on the decoder in the dialogue model, and acquire a target dialogue feature corresponding to the decoded target dialogue reply. The server may acquire the reconstruction loss according to the first vector, the first dialogue feature, the second dialogue feature, and the target dialogue feature. Accordingly, the reconstruction loss may be calculated by equation (13).

$$\mathcal{L}_{rec} = -E_{z_k \sim q_\phi(z_k|x_k, c)} \log p_\psi(x_k|c, z_k) \quad (13),$$

where $\mathcal{L}_{rec}$ represents a reconstruction loss, $E_{z_k \sim q_\phi(z_k|c, x_k)}$ represents a mathematical expectation that makes an overall probability of a reconstructed target dialogue feature sufficiently large by a first dialogue feature $z_k$ obtained by an infinite number of samples from a posterior distribution, $p_\psi(\ )$ represents a decoder, and $x_k$ represents a target dialogue feature.

Accordingly, when the server updates the parameter of the encoder, the posterior network, the prior network, and the decoder in the dialogue model, the parameter may be calculated by equation (14).

$$\theta_{net} = \theta_{net} - lr * \frac{\partial}{\partial \theta_{net}} \mathcal{L}_{rec}, \text{ s.t. net} \in \{Enc, P-net, R-net, Dec\}, \quad (14)$$

where $\theta_{net}$ represents a parameter of net, lr represents a learning rate of a dialogue model, $\mathcal{L}_{rec}$ represents a reconstruction loss, s.t.net $\in$ {Enc,P-net,R-net, Dec} represents that net is one of Enc, P-net, R-net, and Dec, Enc represents an encoder, P-net represents a prior network, R-net represents a posterior network, and Dec represents a decoder.

Accordingly, when the server updates the parameter of the discriminator in the dialogue model according to the discriminator loss, the parameter of the discriminator may be calculated by equation (15).

$$\theta_{Disc} = \theta_{Disc} - lr * \frac{\partial}{\partial \theta_{Disc}} \mathcal{L}_{disc}, \quad (15)$$

where $\theta_{Disc}$ represents a parameter of a discriminator, lr represents a learning rate of a dialogue model, $\partial$ represents a derivation, and $\mathcal{L}_{disc}$ represents a discriminator loss.

404: The server updates the posterior network based on the at least two first dialogue features of the first dialogue.

In some embodiments of this application, the server may obtain at least two first dialogue features, i.e., posterior features, through the above steps. In order to make a prior distribution finally learned by the dialogue model be a distinguishable multi-semantic distribution, the server may control a semantic distance between posterior distributions corresponding to a dialogue preceding text based on an optimization target of the semantic distance.

In some embodiments, the server may maximize a Wasserstein distance between one first dialogue feature and an average of other first dialogue features by using a maximum average difference. Accordingly, the step of updating, by the server, the posterior network based on the at least two first dialogue features of the first dialogue may be that: the server acquires, for any first dialogue feature, an average of other first dialogue features except the first dialogue feature in the at least two first dialogue features, and takes the average as an average dialogue feature. The server may acquire a second Wasserstein distance between the first dialogue feature and the average dialogue feature, and take the second Wasserstein distance as a semantic loss. The server may update a parameter of the posterior network according to the semantic loss. Since the semantic distance between posterior distributions is controlled, the prior distribution is a distinguishable multi-semantic distribution.

When the server acquires an average of other first dialogue features except the first dialogue feature in the at least two first dialogue features, the average may be calculated by the following equation (16).

$$\bar{z} = \frac{1}{K}\sum_{i \in \mathcal{I}} z_i, \mathcal{I} = \{0, 1, \ldots, K\} \backslash \{k\}, \quad (16)$$

where $\bar{z}$ represents an average dialogue feature, K represents the number of first dialogue features, $z_i$ represents an $i^{th}$ first dialogue feature, $i \in \mathcal{I}$ represents i belonging to a set $\mathcal{I}$, $\mathcal{I} = \{0,1,\ldots, K\}\backslash\{k\}$, and the set $\mathcal{I}$ does not include $z_k$ in K first dialogue features.

Accordingly, the server calculates the semantic loss by the following equation (17).

$$\mathcal{L}_{sd} = E_{z_k z_k}[\text{GKF}(z_k, z_k)] - 2E_{z_k \bar{z}}[\text{GKF}(z_k, \bar{z})] + E_{\bar{z}\bar{z}}[\text{GKF}(\bar{z},\bar{z})] \quad (17)$$

where $\mathcal{L}_{sd}$ represents a semantic loss, $z_k$ represents a first dialogue feature, $\bar{z}$ represents an average dialogue feature, GKF( ) represents a Gaussian kernel function, $E_{z_k z_k}$ represents a mathematical expectation that makes a distance between different first dialogue features $z_k$ sampled from a posterior distribution sufficiently small, $E_{z_k \bar{z}}$ represents a mathematical expectation that makes a distance between a first dialogue feature $z_k$ sampled from a posterior distribution and average dialogue features $\bar{z}$ of other posterior distributions sufficiently large, and $E_{\bar{z}\bar{z}}$ represents a mathematical expectation that makes a distance between average dialogue features $\bar{z}$ of other posterior distributions sufficiently small.

Accordingly, when the server updates the parameter of the posterior network according to the semantic loss, the parameter of the posterior network is calculated by the following equation (18).

$$\theta_{R-net} = \theta_{R-net} - lr * \frac{\partial}{\partial \theta_{R-net}}\mathcal{L}_{sd}, \quad (18)$$

where $\theta_{R-net}$ represents a parameter of a posterior network, lr represents a learning rate of a dialogue model, $\partial$ represents a derivation, and $\mathcal{L}_{sd}$ represents a semantic loss.

405: The server updates a discriminator in the dialogue model based on at least two first dialogue features and at least two second dialogue features of a second dialogue. The second dialogue includes a second dialogue preceding text and at least two second dialogue replies.

In some embodiments of this application, the server may set the number of updates for the discriminator. Each time the discriminator is updated, the server selects at least one dialogue from a plurality of dialogues as a second dialogue, and then acquires at least two first dialogue features and at least two second dialogue features of the second dialogue, which may be referred to step 402 and will not be described in detail herein. For a second dialogue reply of any second dialogue, the server may acquire a discriminator loss according to a first dialogue feature and a second dialogue feature corresponding to the second dialogue reply, which may be specifically referred to step 403 and will not be described in detail herein. The server may update the discriminator in the dialogue model according to the discriminator loss. When the server updates the parameter of the discriminator in the dialogue model, reference may be made to equation (15), which will not be described in detail herein.

Steps 401 to 405 are an iterative process of the method for training a dialogue model provided by the embodiments of this application, and the server repeats the above steps until the training end condition is satisfied.

In the embodiments of this application, a dialogue model is updated repeatedly by means of a plurality of dialogue features of a first dialogue, and a posterior network is updated again. Then, a discriminator in the dialogue model is updated according to a plurality of dialogue features of a second dialogue. Different semantics of a dialogue are considered during training, so that a dialogue reply contains multiple semantics, thereby improving the diversity of the dialogue reply generated by the dialogue model.

Figure 5:
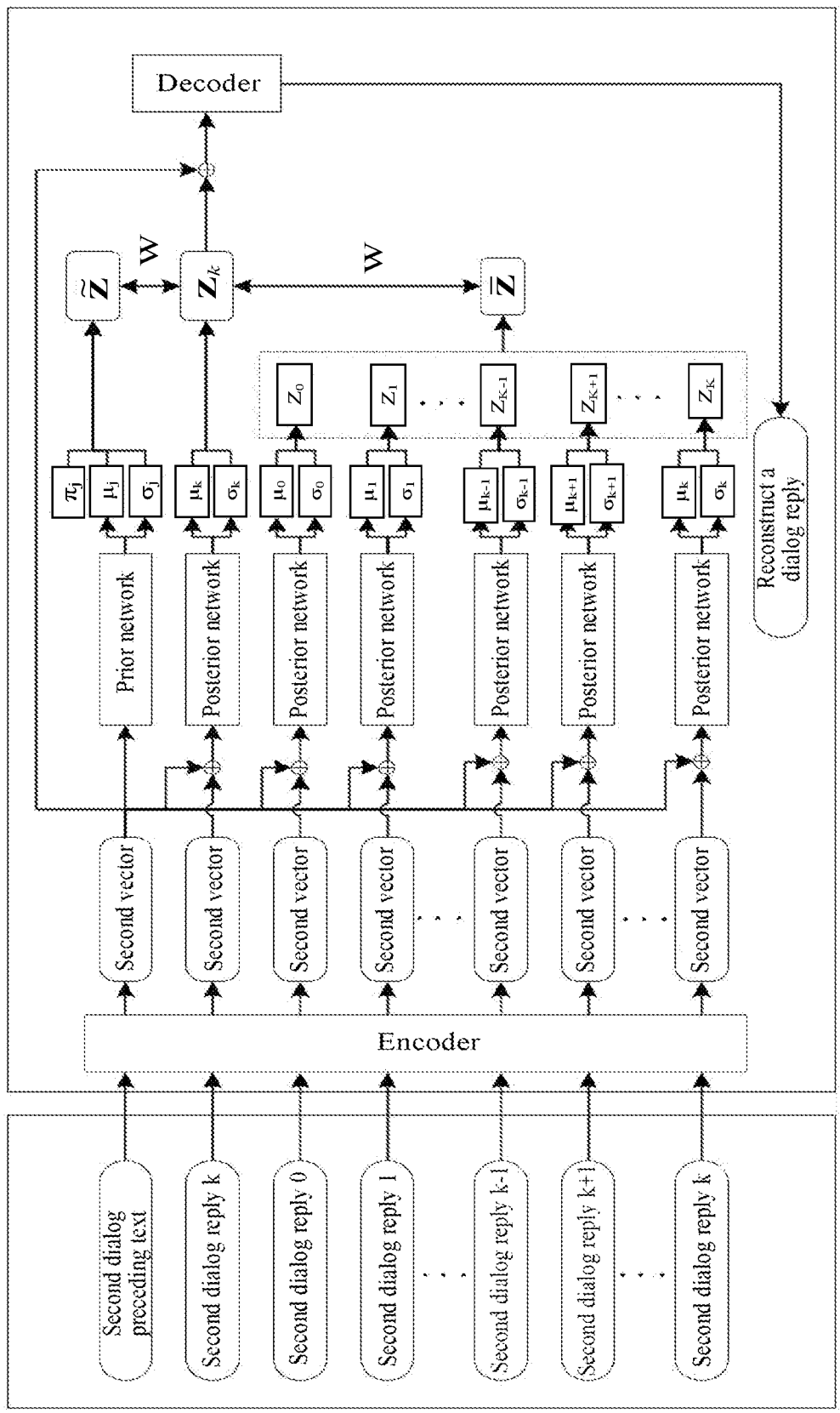
FIG. 5 is a schematic structural diagram of a dialogue model according to an embodiment of this application.

FIG. 5 is a schematic structural diagram of a dialogue model according to an embodiment of this application. As shown in FIG. 5, the left side schematically shows a first dialogue including a first dialogue preceding text and K first dialogue replies. By inputting the first dialogue into the encoder, a first vector of the first dialogue preceding text and a second vector of the first dialogue reply may be obtained. By inputting the first vector into the prior network, a prior distribution may be obtained, and a plurality of second dialogue features may be sampled from each sub-distribution of the prior distribution. By inputting the second vector into the posterior network respectively, a posterior distribution may be obtained, a first dialogue feature may be sampled from a posterior distribution, the first dialogue feature corresponding to a $k^{th}$ first dialogue reply is $z_k$, and an average of other first dialogue features is $\bar{z}$. The decoder decodes the first dialogue feature $z_k$ to obtain a reconstructed dialogue reply that is better similar to the first dialogue reply.

A multi-semantic WAE algorithm used by the embodiments of this application in training the above dialogue model is described below.

/* Enc: Encoder; R-net: PosteriorNetwork;
P-net: PriorNetwork; Disc: Discriminator;
Dec: Decoder*/

Input: corpus $\tilde{D}=\{<\mathcal{C}, \hat{R}>\}$, number of reply clusters K, number of discriminator iterations $n_{critic}$, and number of model iterations max-step.

1  Initialize$\{\theta_{Enc}, \theta_{R-net}, \theta_{P-net}, \theta_{Disc}, \theta_{Dec}\}$
2  for t < max − step do
3     samplingNinstances $\{<C, \hat{R}>\}$from $\tilde{D}$
4     for $x_k \in \hat{R}$ do
5       c = Enc(C), $x_k$ = Enc($x_k$)
6       Sampling $z_k$ fromR-net($x_k$, c)
7       Sampling $\bar{z}$ formP-net(c, K + 1, k)
8  
$$\theta_{P-net} = \theta_{P-net} - lr * \frac{\partial}{\partial \theta_{P-net}}\mathcal{L}_{disc}$$

9  
$$\theta_{R-net} = \theta_{R-net} + lr * \frac{\partial}{\partial \theta_{R-net}}\mathcal{L}_{disc}$$

10  
$$\theta_{net} = \theta_{net} - lr * \frac{\partial}{\partial \theta_{net}}\mathcal{L}_{rec}$$

s.t.net $\in$ {Enc, P-net, R-net, Dec}

11  
$$\theta_{Disc} = \theta_{Disc} - lr * \frac{\partial}{\partial \theta_{Disc}}\mathcal{L}_{disc}$$

12     end
13     for $z_k$, k $\in$ {0, . . . , K} do

14 $\theta_{R-net} = \theta_{R-net} - lr * \dfrac{\partial}{\partial \theta_{R-net}} \mathcal{L}_{sd}$ 15 end
16 for i < $n_{critic}$ do
17  samplingNinstances {<C, $\hat{R}$>}from $\tilde{D}$)
18  for $x_k \in \hat{R}$ do
19   Repeat 5-7

Figure 6:
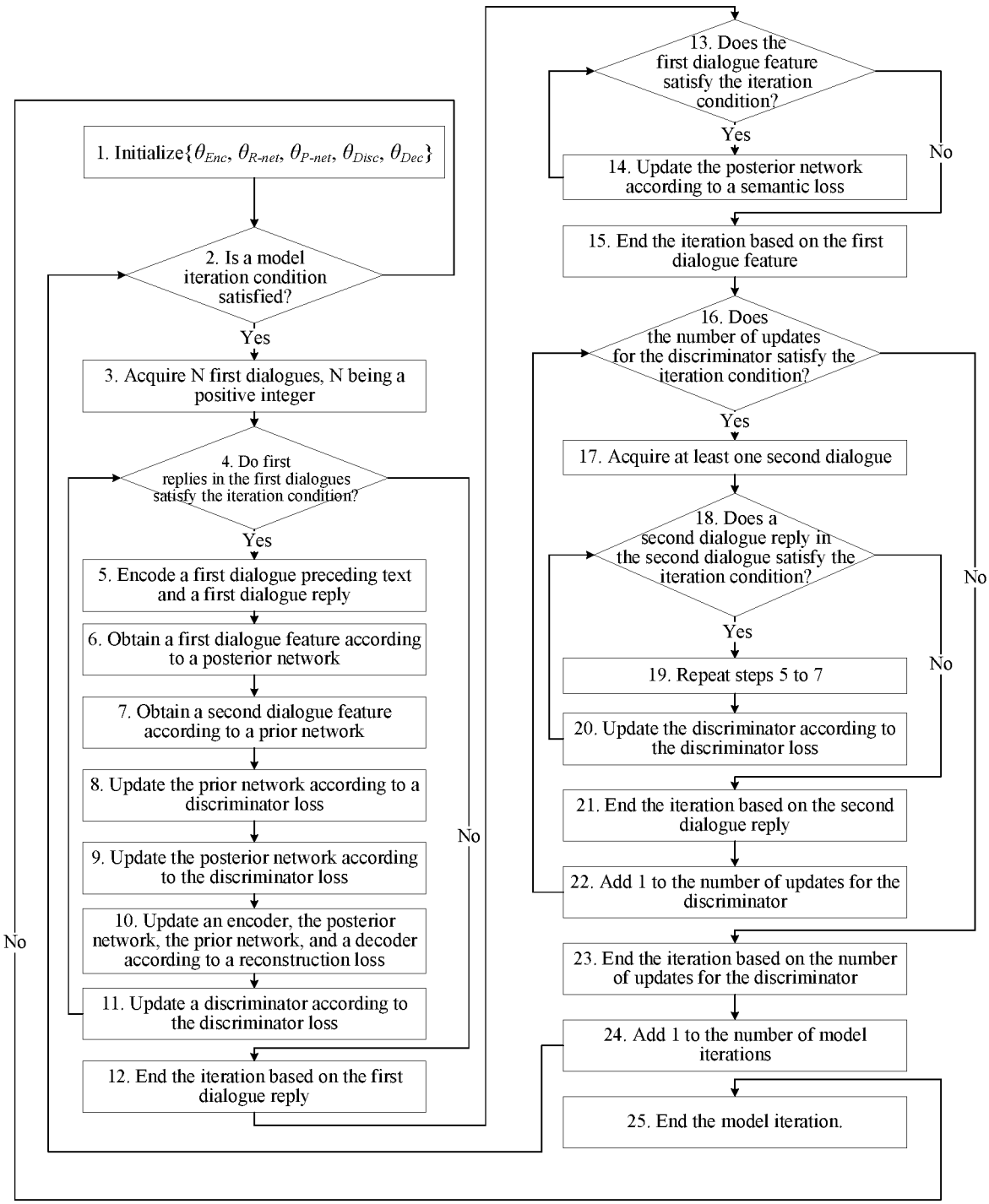
FIG. 6 is a schematic flowchart of a multi-semantic Wasserstein auto-encoder (WAE) algorithm according to an embodiment of this application.

20 $\theta_{Disc} = \theta_{Disc} - lr * \dfrac{\partial}{\partial \theta_{Disc}} \mathcal{L}_{disc}$ 21 end
22 i = i + 1
23 end
24 t = t + 1
25 end In order to clarify the steps described in the above multi-semantic WAE algorithm, reference is made to FIG. 6. FIG. 6 is a schematic flowchart of a multi-semantic WAE algorithm according to an embodiment of this application. The input of the WAE algorithm is a plurality of dialogues. Step 1: Initialize encoder parameters. Step 2 is a model iteration determination condition. Step 3: Acquire at least one first dialogue. Step 4: Perform iteration determination based on a first dialogue reply in the first dialogue. Step 5: Encode a first dialogue preceding text and the first dialogue reply. Step 6: Obtain a first dialogue feature according to a posterior network. Step 7: Obtain a second dialogue feature according to a prior network. Step 8: Update the prior network according to a discriminator loss. Step 9: Update the posterior network according to the discriminator loss. Step 10: Update an encoder, the posterior network, the prior network, and a decoder according to a reconstruction loss. Step 11: Update a discriminator according to the discriminator loss. Step 12: End the iteration based on the first dialogue reply. Step 13: Perform iteration determination based on the first dialogue feature. Step 14: Update the posterior network according to a semantic loss. Step 15: End the iteration based on the first dialogue feature. Step 16: Perform iteration determination based on the number of updates for the discriminator. Step 17: Acquire at least one second dialogue. Step 18: Perform iteration determination based on a second dialogue reply in the second dialogue. Step 19: Repeat steps 5 to 7. Step 20: Update the discriminator according to the discriminator loss. Step 21: End the iteration based on the second dialogue reply. Step 22: Add 1 to the number of updates for the discriminator. Step 23: End the iteration based on the number of updates for the discriminator. Step 24: Add 1 to the number of model iterations. Step 25: End the model iteration.

The corpus $\tilde{D} = \{<\mathcal{C}, \hat{R}>\}$ capable of being input into the WAE algorithm may be obtained by the following algorithm.

Input: dialogue data set $\mathcal{D} = \{<\mathcal{C}, x>\}$, number of candidates M, and threshold $\tau$.
1 $\tilde{D} = \{\}$
2 for $\mathcal{C} \in \mathcal{D}$ do
3  RetrievingM $\mathcal{C}$-relatedpostsas P
4  R = {all responses of P}
5  $\tilde{R}$ = {all r $\in$ R,s.t.relevance(r, $\mathcal{C}$) $\geq \tau$}
6  Clustering r $\in \tilde{R}$ into K clusters
7  $\hat{R}$ = {all r $\in$ Cluster$_k$,s.t.$\forall r_j \in$ Cluster$_k$,
  coherence($r_j, \mathcal{C}$) < coherence(r, $\mathcal{C}$)} $\cup$ {x}
8  $\tilde{D} = \tilde{D} \cup <\mathcal{C}, \hat{R}>$
9 end In order to verify that the dialogue model trained by the method for training a dialogue model provided in the embodiments of this application has a good effect, the embodiments of this application also design an experiment for verification. The experiment is evaluated with two common session data sets. One data set is Douban (from "Response generation by context-aware prototype editing" published in 2019 by Yu Wu, Furu Wei, Shaohan Huang, Yunli Wang, Zhoujun Li, and Ming Zhou on Proceedings of the AAAI Conference on Artificial Intelligence, vol.33, pp.7281-7288). Another data set is DailyDialg (from "DailyDialogue: A manually labelled multi-turn dialogueue dataset" published in 2017 by Yanran Li, Hui Su, Xiaoyu Shen, Wenjie Li, ZiqiangCao, and ShuziNiu on Proceedings of the Eighth International Joint Conference on Natural Language Processing (Volume 1: Long Papers), pp.986-995). A statistical summary of the number of samples in the data set may be seen in Table 1. There are 20,000 and 10,000 vocabularies in the dialogue data sets Douban and DailyDialogue, respectively.

TABLE 1

| Data set | train | valid | vest |
| --- | --- | --- | --- |
| Douban | 894,721 | 15,000 | 15,000 |
| Daily Dialogue | 68,096 | 6,895 | 6,695 |

Other methods for comparison in the experiment are described below. During the experiment, a Multi-Semantic Wasserstein autoencoder (MS-WAE) method provided in the embodiments of this application is compared with Seq2Seq-attn (The standard Seq2Seq architecture with attention mechanism) proposed by Bandanau et al. in 2015, a DCVAE (A discrete Conditional AutoEncoder (CVAE) for response generation on short-text conversation) method proposed by Gao et al. in 2019, an MMPMS (Generating multiple diverse responses with multi-mapping and posterior mapping selection) method proposed by Chen et al. in 2019, and a DialogueWAE (Multimodal response generation with conditional Wasserstein autoencoder) method proposed by Gu et al. in 2018.

The evaluation criteria of the experiment will be described below. During the experiment, the evaluation is performed through four major aspects: BLUE (a Method for Automatic Evaluation of Machine Translation), BOWEmbedding (bagofwordsEmbedding), intra-dist, and inter-dist. BLUE includes Recall, Precision and F1 (F1-Score). BOWEmbedding includes Average, Extrema and Greedy. intra-dist includes dist-1 and dist-2, and inter-dist includes dist-1 and dist-2.

The experimental results may be seen in Table 2.

TABLE 2

| Model | BLUE | | | BOWEmbedding | | | intra-dist | | inter-dist | |
|---|---|---|---|---|---|---|---|---|---|---|
| | Recall | Precision | F1 | Average | Extrema | Greedy | dist-1 | dist-2 | dist-1 | dist-2 |
| DoubanCorpus | | | | | | | | | | |
| Seq2seq-attn | 0.165 | 0.165 | 0.165 | 0.402 | 0.221 | 0.556 | 0.849 | 0.847 | 0.084 | 0.084 |
| DCVAE | 0.134 | 0.101 | 0.115 | 0.378 | 0.220 | 0.285 | 0.539 | 0.646 | 0.090 | 0.128 |
| MMPMS | 0.192 | 0.112 | 0.141 | 0.402 | 0.213 | 0.331 | 0.736 | 0.860 | 0.256 | 0.389 |
| DialogueWAE | 0.360 | 0.218 | 0.272 | 0.537 | 0.341 | 0.700 | 0.701 | 0.769 | 0.345 | 0.541 |
| MS-WAE | 0.356 | 0.221 | 0.273 | 0.556 | 0.320 | 0.566 | 0.872+ | 0.925+ | 0.554+ | 0.879+ |
| Daily Dialogue Corpus | | | | | | | | | | |
| Seq2seq-attn | 0.195 | 0.195 | 0.195 | 0.874 | 0.508 | 0.706 | 0.916 | 0.969 | 0.091 | 0.096 |
| DCVAE | 0.274 | 0.241 | 0.257 | 0.897 | 0.509 | 0.758 | 0.857 | 0.943 | 0.155 | 0.207 |
| MMPMS | 0.301 | 0.230 | 0.261 | 0.915 | 0.506 | 0.758 | 0.883 | 0.968 | 0.304 | 0.438 |
| DialogueWAE | 0.359 | 0.280 | 0.315 | 0.926 | 0.600 | 0.803 | 0.790 | 0.918 | 0.344 | 0.655 |
| MS-WAE | 0.348 | 0.222 | 0.271 | 0.933 | 0.615 | 0.625 | 0.920+ | 0.984+ | 0.578+ | 0.909+ |

Table 2 The numbers with+in Table 2 represent values that exceed an optimal basic threshold and have statistical significance. The data in Table 2 shows that the MA-WAE method proposed by this application significantly improves diversity and maintains correlation.

In addition, an artificial judgment experiment is also designed in this application. 5 participants were recruited during the experiment, from Informativeness (measuring whether a dialogue reply provides meaningful information), Appropriateness (measuring whether a dialogue reply is logical), and Semantic Diversity, respectively. Scoring scores range from 0 to 2, where 0 represents the worst and 2 represents the best.

The experimental results of artificial judgment may be seen in Table 3.

TABLE 3

| Model | Informativeness | Appropriateness | Semantic Diversity |
|---|---|---|---|
| DoubanCorpus | | | |
| Seq2seq-attn | 0.380 ± 0.012 | 0.300 ± 0.003 | 0.000 ± 0.000 |
| DCVAE | 0.644 ± 0.244 | 0.380 ± 0.170 | 0.286 ± 0.054 |
| MMPMS | 0.708 ± 0.180 | 0.432 ± 0.035 | 0.760 ± 0.180 |
| DialogueWAE | 0.982 ± 0.059 | 0.460 ± 0.460 | 1.020 ± 0.043 |
| MS-WAE | 1.150 ± 0.120 | 0.544 ± 0.085 | 1.560 ± 0.326 |
| Daily Dialogue Corpus | | | |
| Seq2seq-attn | 0.320 ± 0.019 | 0.224 ± 0.003 | 0.000 ± 0.000 |
| DCVAE | 0.516 ± 0.043 | 0.246 ± 0.089 | 0.420 ± 0.100 |
| MMPMS | 0.570 ± 0.047 | 0.272 ± 0.430 | 0.570 ± 0.078 |
| DialogueWAE | 0.914 ± 0.015 | 0.292 ± 0.006 | 0.714 ± 0.010 |
| MS-WAE | 1.078 ± 0.073 | 0.358 ± 0.063 | 1.480 ± 0.158 |

The average±standard deviation of all methods is shown in Table 3, and the results show that MS-WAE is greatly superior to the other data sets in terms of semantic diversity, over baseline, on both datasets.

Figure 7:
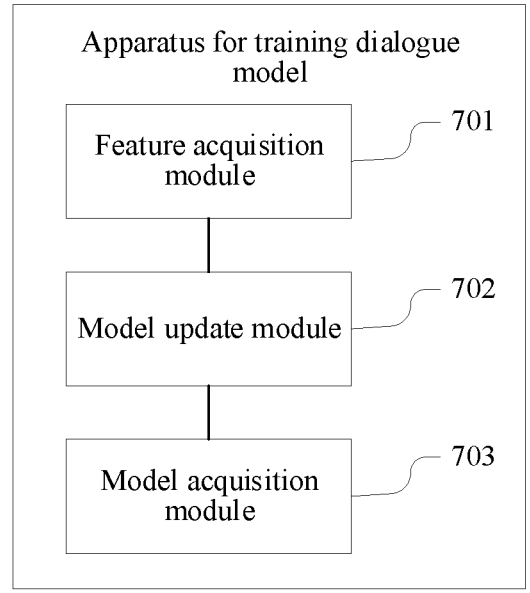
FIG. 7 is a block diagram of an apparatus for training a dialogue model according to an embodiment of this application.

FIG. 7 is a block diagram of an apparatus (e.g., a computer device, an electronic device, a computer system) for training a dialogue model according to an embodiment of this application. The apparatus is configured to perform steps when the above method for training a dialogue model is executed. Referring to FIG. 7, the apparatus includes: a feature acquisition module 701, a model update module 702 and a model acquisition module 703.

The feature acquisition module 701 is configured to acquire at least two first dialogue features and at least two second dialogue features of a first dialogue. The first dialogue features and the second dialogue features represent posterior features and prior features of a first dialogue preceding text and a first dialogue reply respectively. One dialogue preceding text corresponds to at least two dialogue replies. In some embodiments, the feature acquisition module 701 is configured to acquire at least two first dialogue features and at least two second dialogue features of a first dialogue based on a prior network for outputting a probability distribution of dialogue features and a posterior network for estimating the probability distribution of the dialogue features output by the prior network in a dialogue model. The first dialogue features represent posterior features of a dialogue preceding text and a dialogue reply in a dialogue, the second dialogue features represent prior features of a dialogue preceding text and a dialogue reply in a dialogue, and the first dialogue includes a first dialogue preceding text and at least two first dialogue replies.

The model update module 702 is configured to update the dialogue model based on the at least two first dialogue features and the at least two second dialogue features of the first dialogue. The dialogue model includes a prior network and a posterior network for estimating a probability distribution of dialogue features output by the prior network.

The model update module 702 is further configured to update the posterior network based on the at least two first dialogue features of the first dialogue.

The model update module 702 is further configured to update a discriminator in the dialogue model based on at least two first dialogue features and at least two second dialogue features of a second dialogue. The second dialogue includes a second dialogue preceding text and at least two second dialogue replies.

The model acquisition module 703 is configured to take a trained model as the dialogue model in response to satisfying a training end condition.

In some embodiments, the feature acquisition module 701 is configured to: respectively encode, for any first dialogue reply, the first dialogue preceding text and the first dialogue reply based on the dialogue model to obtain a first vector of the first dialogue preceding text and a second vector of the first dialogue reply; acquire a first dialogue feature based on the posterior network according to the first vector and the second vector; and acquire a second dialogue feature based on the prior network according to the first vector and a reply category to which the first dialogue reply belongs, the reply category including at least one another dialogue reply belonging to the same category as the first dialogue reply.

In some embodiments, the feature acquisition module 701 is configured to: respectively encode, for any of the first dialogue replies of the first dialogue, the first dialogue preceding text and the first dialogue reply based on an encoder of the dialogue model to obtain a first vector of the first dialogue preceding text and a second vector of the first dialogue reply; acquire at least two first dialogue features of the first dialogue, the first dialogue features of the first dialogue being obtained by processing the first vector of the first dialogue preceding text and the second vector of the first dialogue reply through the posterior network; and acquire at least two second dialogue features of the first dialogue, the second dialogue features of the first dialogue being obtained by processing the first vector of the first dialogue preceding text and a reply category to which the first dialogue reply belongs through the prior network.

In some embodiments, the feature acquisition module 701 is configured to: respectively input the first dialogue preceding text and the first dialogue reply into an encoder of the dialogue model, which is constructed based on a bidirectional gated circulation unit neural network; and respectively encode the first dialogue preceding text and the first dialogue reply according to the encoder to obtain a first vector of the first dialogue preceding text and a second vector of the first dialogue reply.

In some embodiments, the feature acquisition module 701 is further configured to: acquire a first parameter average and a first parameter variance based on the posterior network according to the first vector and the second vector; and acquire a first dialogue feature according to the first parameter average, the first parameter variance and a first sampling value, the first sampling value being a value of a sampling point acquired from a standard normal distribution.

In some embodiments, the feature acquisition module 701 is configured to: input the first vector and the second vector into the posterior network, and output a first parameter average and a first parameter variance; and acquire a first dialogue feature according to the first parameter average, the first parameter variance and a first sampling value, the first sampling value being obtained by sampling a standard normal distribution.

In some embodiments, the feature acquisition module 701 is configured to: determine a target probability distribution according to the first vector and the reply category to which the first dialogue reply belongs, the target probability distribution being a probability distribution corresponding to the reply category in the probability distribution of dialogue features output by the prior network; acquire a second parameter average and a second parameter variance based on the prior network according to the first vector; and acquire a second dialogue feature according to the second parameter average, the second parameter variance and a second sampling value, the second sampling value being a value of a sampling point acquired from the target probability distribution.

In some embodiments, the feature acquisition module 701 is configured to: determine a target probability distribution according to the first vector and the reply category to which the first dialogue reply belongs, the target probability distribution being a probability distribution corresponding to the reply category in the probability distribution output by the prior network; input the first vector into the prior network to obtain a second parameter average and a second parameter variance; and acquire a second dialogue feature according to the second parameter average, the second parameter variance and a second sampling value, the second sampling value being obtained by sampling the target probability distribution.

In some embodiments, the model update module 702 is configured to: acquire, for any first dialogue reply of the first dialogue, a first dialogue feature and a second dialogue feature corresponding to the first dialogue reply; acquire a discriminator loss according to a first vector and the first and second dialogue features corresponding to the first dialogue reply, the first vector being obtained based on encoding of the first dialogue preceding text; acquire a reconstruction loss according to the first vector and the first and second dialogue features corresponding to the first dialogue reply; update parameters of the posterior network and the prior network in the dialogue model according to the discriminator loss; update parameters of an encoder, the posterior network, the prior network, and a decoder in the dialogue model according to the reconstruction loss; and update a parameter of the discriminator of the dialogue model according to the discriminator loss.

In some embodiments, the model update module 702 is configured to: acquire a first Wasserstein distance between the first and second dialogue features corresponding to the first dialogue reply based on the discriminator of the dialogue model according to the first vector of the first dialogue preceding text and the first and second dialogue features corresponding to the first dialogue reply, and take the first Wasserstein distance as a discriminator loss.

In some embodiments, the model update module 702 is configured to: decode the first dialogue feature based on the decoder in the dialogue model to acquire a target dialogue feature; and acquire a reconstruction loss according to the first vector, the first and second dialogue features corresponding to the first dialogue reply, and the target dialogue feature.

In some embodiments, the model update module 702 is further configured to: acquire, for any first dialogue feature of the first dialogue, an average of other first dialogue features except the first dialogue feature in the at least two first dialogue features, and take the average as an average dialogue feature; acquire a second Wasserstein distance between the first dialogue feature and the average dialogue feature, and take the second Wasserstein distance as a semantic loss; and update a parameter of the posterior network according to the semantic loss.

In the embodiments of this application, a dialogue model is updated repeatedly by means of a plurality of dialogue features of a first dialogue, and a posterior network is updated again. Then, a discriminator in the dialogue model is updated according to a plurality of dialogue features of a second dialogue. By updating a parameter of a dialogue model repeatedly according to dialogue features of a dialogue and considering different semantics of the dialogue, a dialogue reply contains multiple semantics, and the diversity of the dialogue reply generated by the dialogue model is improved.

The apparatus for training a dialogue model provided in the above embodiments is illustrated by only the division of the above functional modules when running an application. In practical applications, the above functional allocation may be performed by different functional modules as required, i.e., an internal structure of the apparatus is divided into different functional modules so as to complete all or part of the functions described above. In addition, the apparatus for training a dialogue model provided in the above embodiments belongs to the same concept as the embodiments of the method for training a dialogue model, and the specific implementation process thereof is described in detail in the embodiments of the method, which will not be described in detail herein.

Figure 8:
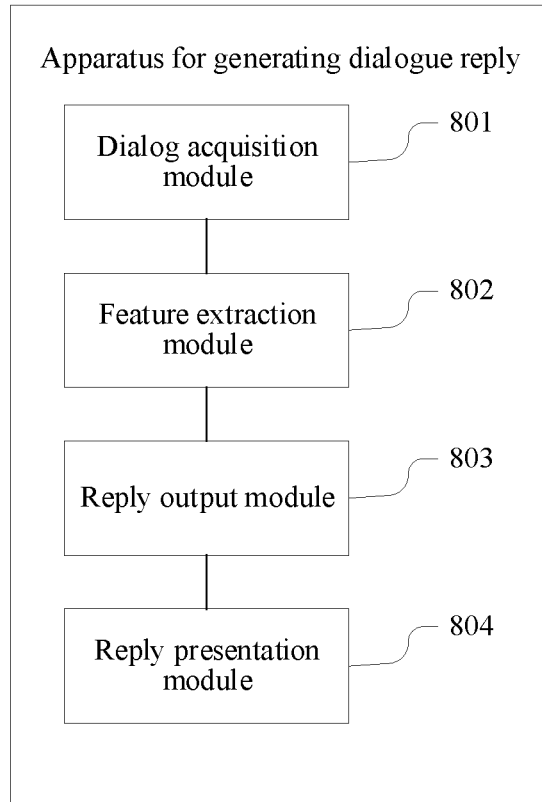
FIG. 8 is a block diagram of an apparatus for generating a dialogue reply according to an embodiment of this application.

FIG. 8 is a block diagram of an apparatus (e.g., a computer device, an electronic device, a computer system) for generating a dialogue reply according to an embodiment of this application. The apparatus is configured to perform steps when the above method for generating a dialogue reply is executed. Referring to FIG. 8, the apparatus includes: a dialogue acquisition module 801, a feature extraction module 802, a reply output module 803, and a reply presentation module 804.

The dialogue acquisition module 801 is configured to acquire a dialogue preceding text.

The feature extraction module 802 is configured to input the dialogue preceding text into a dialogue model, and randomly extract a target dialogue feature from first dialogue features corresponding to a plurality of dialogue replies based on a prior network in the dialogue model.

The reply output module 803 is configured to decode the target dialogue feature based on a decoder in the dialogue model, and output a target dialogue reply.

The reply presentation module 804 is configured to present the target dialogue reply.

In the embodiments of this application, a dialogue reply corresponding to a dialogue preceding text is acquired by means of random extraction, so that when the same dialogue preceding text is input repeatedly, different dialogue replies may be obtained, thereby improving the diversity of dialogue replies.

The apparatus for generating a dialogue reply provided in the above embodiments is illustrated by only the division of the above functional modules when running an application. In practical applications, the above functional allocation may be performed by different functional modules as required, i.e. an internal structure of the apparatus is divided into different functional modules so as to complete all or part of the functions described above. In addition, the apparatus for generating a dialogue reply provided in the above embodiments belongs to the same concept as the embodiments of the method for generating a dialogue reply, and the specific implementation process thereof is described in detail in the embodiments of the method, which will not be described in detail herein.

In the embodiments of this application, a computer device may be configured as a terminal or a server. When the computer device is configured as a terminal, the technical solution provided in the embodiments of this application may be implemented by the terminal as an executive body. When the computer device is configured as a server, the technical solution provided in the embodiments of this application may be implemented by the server as an executive body. A technical method provided in this application may also be implemented by interaction between the terminal and the server. This is not limited by the embodiments of this application.

Figure 9:
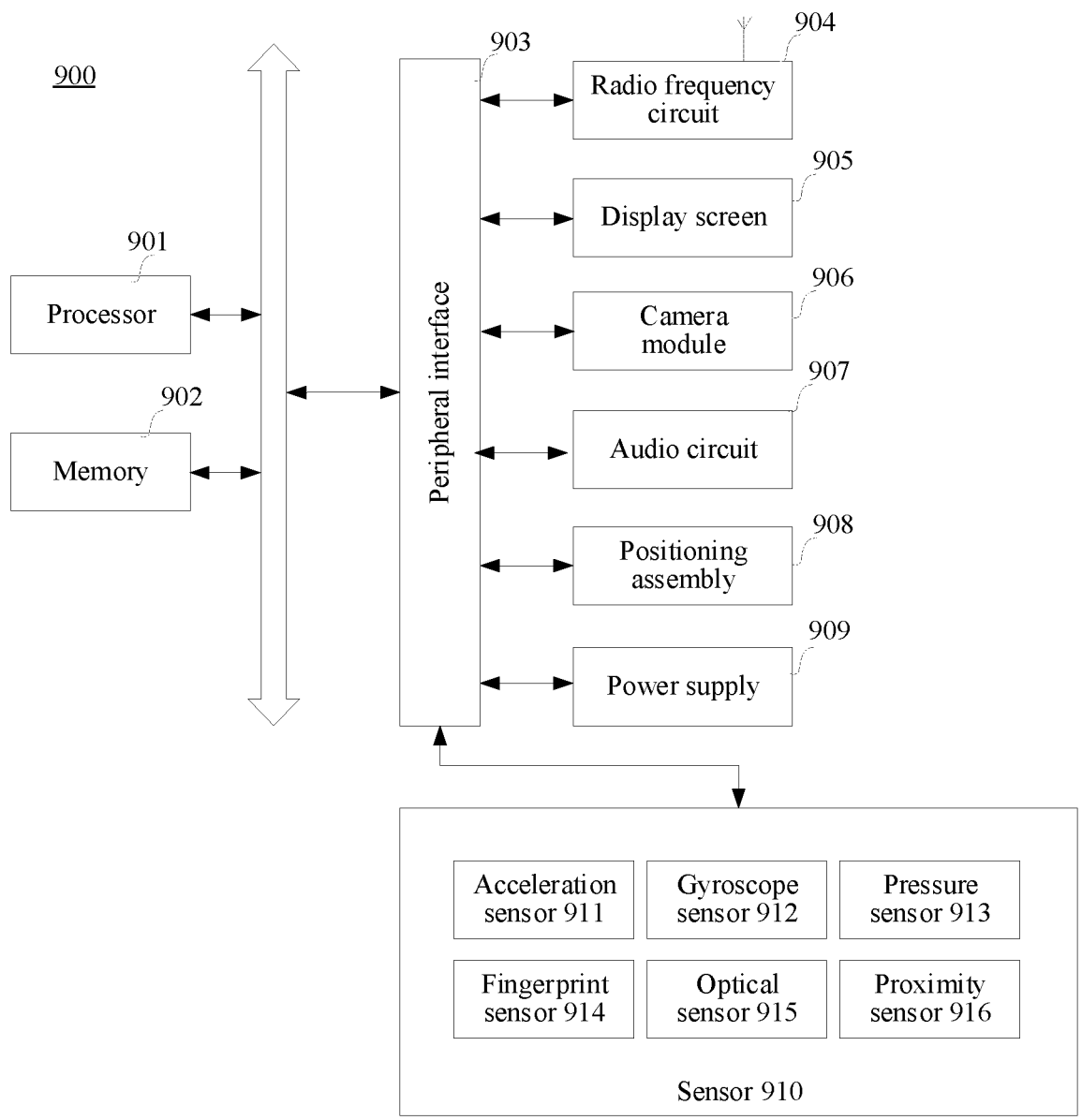
FIG. 9 is a structural block diagram of a terminal according to an embodiment of this application.

When the computer device is configured as a terminal, FIG. 9 is a structural block diagram of a terminal 900 according to an embodiment of this application. The terminal 900 may be: a smartphone, a pad, a moving picture experts group audio layer III (MP3) player, a moving picture experts group audio layer IV (MP4) player, a laptop, or a desktop. The terminal 900 may also be referred to by other names as user equipment, a portable terminal, a laptop terminal, a desktop terminal, etc.

Generally, the terminal 900 includes: a processor 901 and a memory 902.

The processor 901 may include one or more processing cores, such as a 4-core processor or an 8-core processor. The processor 901 may be implemented by at least one hardware form in a digital signal processing (DSP), a field-programmable gate array (FPGA), and a programmable logic array (PLA). The processor 901 may also include a main processor and a co-processor. The main processor is a processor for processing data in a wake-up state, also referred to as a central processing unit (CPU). The coprocessor is a low-power processor configured to process data in a standby state. In some embodiments, the processor 901 may be integrated with a graphics processing unit (GPU) that is responsible for rendering and drawing content needing to be displayed by a display screen. In some embodiments, the processor 901 may also include an AI processor for processing computing operations related to machine learning.

The memory 902 may include one or more computer-readable storage media, which may be non-transitory. The memory 902 may also include a high-speed random access memory, as well as non-volatile memory, such as one or more disk storage devices and flash storage devices. In some embodiments, the non-transitory computer-readable storage medium in the memory 902 is configured to store at least one instruction for execution by the processor 901 to execute the method for training a dialogue model or the method for generating a dialogue reply provided by the method embodiments of this application.

In some embodiments, the terminal 900 also includes: a peripheral interface 903 and at least one peripheral. The processor 901, the memory 902 and the peripheral interface 903 may be connected by a bus or a signal line. Each peripheral may be connected to the peripheral interface 903 by a bus, signal line, or a circuit board. Specifically, the peripherals include: at least one of a radio frequency (RF) circuit 904, a display screen 905, a camera assembly 906, an audio circuit 907, a positioning assembly 908, and a power supply 909.

The peripheral interface 903 may be configured to connect at least one peripheral related to input/output (I/O) to the processor 901 and the memory 902. In some embodiments, the processor 901, the memory 902 and the peripheral interface 903 are integrated on the same chip or circuit board. In some other embodiments, any one or two of the processor 901, the memory 902 and the peripheral interface 903 may be implemented on a separate chip or circuit board. This is not limited by the present embodiment.

The RF circuit 904 is configured to receive and transmit RF signals, also referred to as electromagnetic signals. The RF circuit 904 communicates with a communication network and other communication devices through the electromagnetic signals. The RF circuit 904 converts electrical signals into electromagnetic signals for transmission, or converts received electromagnetic signals into electrical signals. In some embodiments, the RF circuit 904 includes: an antenna system, an RF transceiver, one or more amplifiers, a tuner, an oscillator, a digital signal processor, a codec chip set, a subscriber identity module card, etc. The RF circuit 904 may communicate with other terminals through at least one wireless communication protocol. The wireless communication protocol includes, but is not limited to, a metropolitan area network, different generations of mobile communication networks (2G, 3G, 4G, and 5G), a wireless local area network, and/or a wireless fidelity (Wi-Fi) network. In some embodiments, the RF circuit 904 may also include a circuit related to near field communication (NFC). This is not limited by this application.

The display screen 905 is configured to display a user interface (UI). The UI may include a graph, a text, an icon, a video, and any combination thereof. When the display screen 905 is a touch display screen, the display screen 905 also has the ability to collect a touch signal at or above the surface of the display screen 905. The touch signal may be input, as a control signal, to the processor 901 for processing. At this moment, the display screen 905 may also be configured to provide virtual buttons and/or virtual keyboards, also referred to as soft buttons and/or soft keyboards. In some embodiments, there may be one display screen 905 arranged on a front panel of the terminal 900. In some other embodiments, there may be two display screens 905 respectively arranged on different surfaces of the terminal 900 or in a folded design. In still other embodiments, the display screen 905 may be a flexible display screen arranged on a curved or folded surface of the terminal 900. Even further, the display screen 905 may be arranged in a non-rectangular irregular pattern, i.e. a special-shaped screen. The display screen 905 may be made of materials such as liquid crystal display (LCD) and organic light-emitting diode (OLED).

The camera assembly 906 is configured to capture images or video. In some embodiments, the camera assembly 906 includes a front camera and a rear camera. Generally, the front camera is arranged on the front panel of the terminal, and the rear camera is arranged on the rear surface of the terminal. In some embodiments, there are at least two rear cameras, which are respectively any of a main camera, a depth-of-field camera, a wide-angle camera, and a telephoto camera, to implement background blur through fusion of the main camera and the depth-of-field camera, panoramic photographing and virtual reality (VR) photographing through fusion of the main camera and the wide-angle camera, or other fusion photographing functions. In some embodiments, the camera assembly 906 may also include a flashlight. The flash may be a monochrome temperature flash, or may be a double color temperature flash. The double color temperature flash refers to a combination of a warm light flash and a cold light flash, and may be used for light compensation under different color temperatures.

The audio circuit 907 may include a microphone and a speaker. The microphone is configured to collect sound waves from a user and an environment and convert the sound waves into electrical signals that are input to the processor 901 for processing or to the RF circuit 904 for voice communication. For purposes of stereo collection or noise reduction, there may be multiple microphones, which are respectively arranged at different parts of the terminal 900. The microphone may further be an array microphone or an omni-directional acquisition type microphone. The speaker is configured to convert the electrical signals from the processor 901 or the RF circuit 904 into sound waves. The speaker may be a conventional film speaker, or may be a piezoelectric ceramic speaker. When the speaker is the piezoelectric ceramic speaker, the speaker can not only convert an electric signal into sound waves audible to a human being, but also convert an electric signal into sound waves inaudible to the human being for ranging and other purposes. In some embodiments, the audio circuit 907 may also include a headphone jack.

The positioning assembly 908 is configured to position a current geographic location of the terminal 900 to implement navigation or location-based service (LBS). The positioning assembly 908 may be a positioning assembly based on a global positioning system (GPS) of the United States, a Beidou system of China, a Glonass system of Russia, or a Galileo system of the European Union.

The power supply 909 is configured to power the various assemblies in the terminal 900. The power supply 909 may be AC, DC, disposable or rechargeable batteries. When the power supply 909 includes a rechargeable battery, the rechargeable battery may support either wired charging or wireless charging. The rechargeable battery may also be configured to support fast charge technology.

In some embodiments, the terminal 900 also includes one or more sensors 910. The one or more sensors 910 include, but are not limited to: an acceleration sensor 911, a gyroscope sensor 912, a pressure sensor 913, a fingerprint sensor 914, an optical sensor 915, and a proximity sensor 916.

The acceleration sensor 911 may detect the magnitude of acceleration on three coordinate axes of a coordinate system established with the terminal 900. For example, the acceleration sensor 911 may be configured to detect the components of gravitational acceleration on three coordinate axes. The processor 901 may control the display screen 905 to display the UI in a lateral view or a longitudinal view according to a gravitational acceleration signal collected by the acceleration sensor 911. The acceleration sensor 911 may also be configured to collect game or user motion data.

The gyroscope sensor 912 may detect a body direction and a rotation angle of the terminal 900, and the gyroscope sensor 912 may collect a 3D motion of the terminal 900 by a user in cooperation with the acceleration sensor 911. The processor 901 may implement the following functions according to the data collected by the gyroscope sensor 912: motion sensing (such as changing the UI according to a tilting operation of the user), image stabilization at the time of photographing, game control, and inertial navigation.

The pressure sensor 913 may be arranged on a side frame of the terminal 900 and/or a lower layer of the display screen 905. When the pressure sensor 913 is arranged on the side frame of the terminal 900, a grip signal of the user to the terminal 900 may be detected, and the processor 901 performs left and right hand recognition or quick operation according to the grip signal collected by the pressure sensor 913. When the pressure sensor 913 is arranged on the lower layer of the display screen 905, the processor 901 controls an operable control on the UI interface according to the pressure operation of the user on the display screen 905. The operable control includes at least one of a button control, a scroll-bar control, an icon control, and a menu control.

The fingerprint sensor 914 is configured to collect a fingerprint of the user, and the identity of the user is recognized by the processor 901 according to the fingerprint collected by the fingerprint sensor 914, or the identity of the user is recognized by the fingerprint sensor 914 according to the collected fingerprint. Upon recognizing the identity of the user as a trusted identity, the user is authorized by the processor 901 to perform related sensitive operations including unlocking the screen, viewing encrypted information, downloading software, paying for and changing settings, etc. The fingerprint sensor 914 may be arranged on the front, back, or side of the terminal 900. When a physical key or vendor Logo is arranged on the terminal 900, the fingerprint sensor 914 may be integrated with the physical key or vendor Logo.

The optical sensor 915 is configured to collect ambient light intensity. In one embodiment, the processor 901 may control the display brightness of the display screen 905 according to the ambient light intensity collected by the optical sensor 915. Specifically, when the ambient light intensity is high, the display brightness of the display screen 905 is increased. When the ambient light intensity is low, the display brightness of the display screen 905 is decreased. In another embodiment, the processor 901 may also dynamically adjust camera parameters of the camera assembly 906 according to the ambient light intensity collected by the optical sensor 915.

The proximity sensor 916, also referred to as a distance sensor, is typically arranged on the front panel of the terminal 900. The proximity sensor 916 is configured to collect a distance between the user and the front of the terminal 900. In one embodiment, when the proximity sensor 916 detects that the distance between the user and the front surface of the terminal 900 is gradually reduced, the processor 901 controls the display screen 905 to switch from a screen-on state to a screen-off state. When the proximity sensor 916 detects that the distance between the user and the front surface of the terminal 900 is gradually increased, the processor 901 controls the display screen 905 to switch from a screen-off state to a screen-on state.

It will be appreciated by those skilled in the art that the structure shown in FIG. 9 is not limiting of the terminal 900 and may include more or fewer assemblies than illustrated, or some assemblies may be combined, or different assembly arrangements may be employed.

Figure 10:
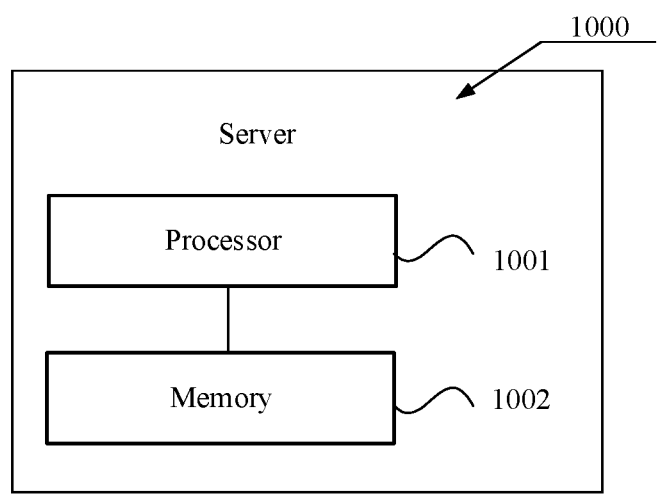
FIG. 10 is a schematic structural diagram of a server according to an embodiment of this application.

When the computer device is configured as a server, FIG. 10 is a schematic structural diagram of a server according to an embodiment of this application. The server 1000 may generate relatively large differences due to different configurations or performances, and may include one or more CPUs 1001 and one or more memories 1002. The memory 1002 stores at least one instruction loaded and executed by the processor 1001 to implement the method for training a dialogue model or the method for generating a dialogue reply provided by the various method embodiments described above. Of course, the server may also have components such as a wired or wireless network interface, a keyboard, and an I/O interface for input and output. The server 1000 may also include other components for implementing device functions, which will not be described in detail herein.

Embodiments of this application also provide a computer-readable storage medium applied to a computer device. The computer-readable storage medium stores at least one program code for being executed by a processor and implementing an operation performed by the computer device in the method for training a dialogue model or the method for generating a dialogue reply in the embodiments of this application.

A person of ordinary skill in the art may understand that all or some of the steps in the foregoing embodiments may be implemented by hardware or a program instructing relevant hardware. The program may be stored in a computer-readable storage medium. The storage medium may be: a ROM, a magnetic disk, or an optical disc, or the like.

The foregoing descriptions are merely exemplary embodiments of this application, but are not intended to limit this application. Any modification, equivalent replacement, or improvement made within the spirit and principle of this application shall fall within the protection scope of this application.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs dialogue model training and dialogue reply generation. In practical application, the foregoing functions may be allocated to and completed by different functional modules according to requirements, that is, an inner structure of a device is divided into different functional modules to implement all or a part of the functions described above.

What is claimed is:

1. A method for training a dialogue model that includes a prior network and a posterior network, the method comprising:
acquiring, based on the prior network and the posterior network, at least two first dialogue features and at least two second dialogue features of a first dialogue, wherein:
the first dialogue features represent posterior features of a first dialogue preceding text and a first dialogue reply in the first dialogue;
the second dialogue features represent prior features of the first dialogue preceding text and the first dialogue reply in the first dialogue; and
the first dialogue includes the first dialogue preceding text and at least two first dialogue replies;
outputting, using the prior network, a probability distribution of dialogue features in accordance with the acquired dialogue features;
estimating, using the posterior network, the probability distribution of the dialogue features output by the prior network;
updating the dialogue model based on the at least two first dialogue features and the at least two second dialogue features of the first dialogue;
updating the posterior network based on the at least two first dialogue features of the first dialogue;
updating a discriminator in the dialogue model based on at least two first dialogue features and at least two second dialogue features of a second dialogue;
in accordance with a determination that the dialogue model has satisfied a training end condition, determining that the dialogue model is a trained dialogue model;
acquiring a second dialogue preceding text;
inputting the second dialogue preceding text into the trained dialogue model, wherein the trained dialogue model is configured to randomly extract a target dialogue feature from second dialogue features corresponding to a plurality of dialogue replies based on the prior network in the dialogue model;

decoding the target dialogue feature based on a decoder in the trained dialogue model to generate a target dialogue reply; and outputting the target dialogue reply.

2. The method according to claim 1, wherein acquiring the at least two first dialogue features and the at least two second dialogue features of the first dialogue based on the prior network and the posterior network in the dialogue model comprises:

respectively encoding, for any of the first dialogue replies of the first dialogue, the first dialogue preceding text and the first dialogue reply based on an encoder of the dialogue model to obtain a first vector of the first dialogue preceding text and a second vector of the first dialogue reply;

acquiring at least two first dialogue features of the first dialogue, the first dialogue features of the first dialogue being obtained by processing the first vector of the first dialogue preceding text and the second vector of the first dialogue reply through the posterior network; and acquiring at least two second dialogue features of the first dialog, the second dialogue features of the first dialogue being obtained by processing the first vector of the first dialogue preceding text and a reply category to which the first dialogue reply belongs through the prior network.

3. The method according to claim 2, wherein acquiring the at least two first dialogue features of the first dialogue comprises:

inputting the first vector and the second vector into the posterior network;

outputting, by the posterior network, a first parameter average and a first parameter variance; and acquiring a first dialogue feature according to the first parameter average, the first parameter variance and a first sampling value, wherein the first sampling value is obtained by sampling a standard normal distribution.

4. The method according to claim 2, wherein acquiring the at least two second dialogue features of the first dialogue comprises:

determining a target probability distribution according to the first vector and the reply category to which the first dialogue reply belongs, the target probability distribution being a probability distribution corresponding to the reply category in the probability distribution output by the prior network;

inputting the first vector into the prior network to obtain a second parameter average and a second parameter variance; and acquiring a second dialogue feature according to the second parameter average, the second parameter variance and a second sampling value, the second sampling value being obtained by sampling the target probability distribution.

5. The method according to claim 1, wherein updating the dialogue model based on the at least two first dialogue features and the at least two second dialogue features of the first dialogue comprises:

acquiring, for any of the first dialogue replies of the first dialogue, a first dialogue feature and a second dialogue feature corresponding to the first dialogue reply;

acquiring a discriminator loss according to a first vector and the first and second dialogue features corresponding to the first dialogue reply, the first vector being obtained based on encoding of the first dialogue preceding text;

acquiring a reconstruction loss according to the first vector and the first and second dialogue features corresponding to the first dialogue reply;

updating parameters of the posterior network and the prior network in the dialogue model according to the discriminator loss;

updating parameters of an encoder, the posterior network, the prior network, and a decoder in the dialogue model according to the reconstruction loss; and updating a parameter of the discriminator of the dialogue model according to the discriminator loss.

6. The method according to claim 5, wherein acquiring the discriminator loss comprises:

acquiring a first Wasserstein distance between the first and second dialogue features corresponding to the first dialogue reply based on the discriminator of the dialogue model according to the first vector of the first dialogue preceding text and the first and second dialogue features corresponding to the first dialogue reply, and taking the first Wasserstein distance as a discriminator loss.

7. The method according to claim 5, wherein acquiring the reconstruction loss comprises:

decoding the first dialogue feature based on the decoder in the dialogue model to acquire a target dialogue feature; and acquiring a reconstruction loss according to the first vector, the first and second dialogue features corresponding to the first dialogue reply, and the target dialogue feature.

8. The method according to claim 1, wherein updating the posterior network based on the at least two first dialogue features of the first dialogue comprises:

acquiring, for any first dialogue feature of the first dialogue, an average of other first dialogue features except the first dialogue feature in the at least two first dialogue features, and taking the average as an average dialogue feature;

acquiring a second Wasserstein distance between the first dialogue feature and the average dialogue feature, and taking the second Wasserstein distance as a semantic loss; and updating a parameter of the posterior network according to the semantic loss.

9. A computer device for training a dialogue model that includes a prior network and a posterior network, comprising:

one or more processors; and memory storing one or more programs, the one or more programs comprising instructions that, when executed by the one or more processors, cause the one or more processors to perform operations comprising:

acquiring, based on the prior network and the posterior network, at least two first dialogue features and at least two second dialogue features of a first dialogue, wherein:

the first dialogue features represent posterior features of a first dialogue preceding text and a first dialogue reply in the first dialogue;

the second dialogue features represent prior features of the first dialogue preceding text and the first dialogue reply in the first dialogue; and the first dialogue includes the first dialogue preceding text and at least two first dialogue replies;

outputting, using the prior network, a probability distribution of dialogue features in accordance with the acquired dialogue features;

estimating, using the posterior network, the probability distribution of the dialogue features output by the prior network;

updating the dialogue model based on the at least two first dialogue features and the at least two second dialogue features of the first dialogue;

updating the posterior network based on the at least two first dialogue features of the first dialogue;

updating a discriminator in the dialogue model based on at least two first dialogue features and at least two second dialogue features of a second dialogue;

in accordance with a determination that the dialogue model has satisfied a training end condition, determining that the dialogue model is a trained dialogue model;

acquiring a second dialogue preceding text;

inputting the second dialogue preceding text into the trained dialogue model, wherein the trained dialogue model is configured to randomly extract a target dialogue feature from second dialogue features corresponding to a plurality of dialogue replies based on the prior network in the dialogue model;

decoding the target dialogue feature based on a decoder in the trained dialogue model to generate a target dialogue reply; and outputting the target dialogue reply.

10. The computer device according to claim 9, wherein acquiring the at least two first dialogue features and the at least two second dialogue features of the first dialogue based on the prior network and the posterior network in the dialogue model comprises:

respectively encoding, for any of the first dialogue replies of the first dialogue, the first dialogue preceding text and the first dialogue reply based on an encoder of the dialogue model to obtain a first vector of the first dialogue preceding text and a second vector of the first dialogue reply;

acquiring at least two first dialogue features of the first dialogue, the first dialogue features of the first dialogue being obtained by processing the first vector of the first dialogue preceding text and the second vector of the first dialogue reply through the posterior network; and acquiring at least two second dialogue features of the first dialog, the second dialogue features of the first dialogue being obtained by processing the first vector of the first dialogue preceding text and a reply category to which the first dialogue reply belongs through the prior network.

11. The computer device according to claim 10, wherein acquiring the at least two first dialogue features of the first dialogue comprises:

inputting the first vector and the second vector into the posterior network;

outputting, by the posterior network, a first parameter average and a first parameter variance; and acquiring a first dialogue feature according to the first parameter average, the first parameter variance and a first sampling value, wherein the first sampling value is obtained by sampling a standard normal distribution.

12. The computer device according to claim 10, wherein acquiring the at least two second dialogue features of the first dialogue comprises:

determining a target probability distribution according to the first vector and the reply category to which the first dialogue reply belongs, the target probability distribution being a probability distribution corresponding to the reply category in the probability distribution output by the prior network;

inputting the first vector into the prior network to obtain a second parameter average and a second parameter variance; and acquiring a second dialogue feature according to the second parameter average, the second parameter variance and a second sampling value, the second sampling value being obtained by sampling the target probability distribution.

13. The computer device according to claim 9, wherein updating the dialogue model based on the at least two first dialogue features and the at least two second dialogue features of the first dialogue comprises:

acquiring, for any of the first dialogue replies of the first dialogue, a first dialogue feature and a second dialogue feature corresponding to the first dialogue reply;

acquiring a discriminator loss according to a first vector and the first and second dialogue features corresponding to the first dialogue reply, the first vector being obtained based on encoding of the first dialogue preceding text;

acquiring a reconstruction loss according to the first vector and the first and second dialogue features corresponding to the first dialogue reply;

updating parameters of the posterior network and the prior network in the dialogue model according to the discriminator loss;

updating parameters of an encoder, the posterior network, the prior network, and a decoder in the dialogue model according to the reconstruction loss; and updating a parameter of the discriminator of the dialogue model according to the discriminator loss.

14. The computer device according to claim 13, wherein acquiring the discriminator loss comprises:

acquiring a first Wasserstein distance between the first and second dialogue features corresponding to the first dialogue reply based on the discriminator of the dialogue model according to the first vector of the first dialogue preceding text and the first and second dialogue features corresponding to the first dialogue reply, and taking the first Wasserstein distance as a discriminator loss.

15. The computer device according to claim 13, wherein acquiring the reconstruction loss comprises:

decoding the first dialogue feature based on the decoder in the dialogue model to acquire a target dialogue feature; and acquiring a reconstruction loss according to the first vector, the first and second dialogue features corresponding to the first dialogue reply, and the target dialogue feature.

16. The computer device according to claim 9, wherein updating the posterior network based on the at least two first dialogue features of the first dialogue comprises:

acquiring, for any first dialogue feature of the first dialogue, an average of other first dialogue features except the first dialogue feature in the at least two first dialogue features, and taking the average as an average dialogue feature;

acquiring a second Wasserstein distance between the first dialogue feature and the average dialogue feature, and taking the second Wasserstein distance as a semantic loss; and updating a parameter of the posterior network according to the semantic loss.

17. A non-transitory computer-readable storage medium, storing a computer program for training a dialogue model that includes a prior network and a posterior network, the computer program, when executed by one or more processors of a computer device, cause the one or more processors to perform operations comprising:
  acquiring, based on the prior network and the posterior network, at least two first dialogue features and at least two second dialogue features of a first dialogue, wherein:
    the first dialogue features represent posterior features of a first dialogue preceding text and a first dialogue reply in the first dialogue;
    the second dialogue features represent prior features of the first dialogue preceding text and the first dialogue reply in the first dialogue; and
    the first dialogue includes the first dialogue preceding text and at least two first dialogue replies;
  outputting, using the prior network, a probability distribution of dialogue features in accordance with the acquired dialogue features;
  estimating, using the posterior network, the probability distribution of the dialogue features output by the prior network;
  updating the dialogue model based on the at least two first dialogue features and the at least two second dialogue features of the first dialogue;
  updating the posterior network based on the at least two first dialogue features of the first dialogue;
  updating a discriminator in the dialogue model based on at least two first dialogue features and at least two second dialogue features of a second dialogue;
  in accordance with a determination that the dialogue model has satisfied a training end condition, determining that the dialogue model is a trained dialogue model;
  acquiring a second dialogue preceding text;
  inputting the second dialogue preceding text into the trained dialogue model, wherein the trained dialogue model is configured to randomly extract a target dialogue feature from second dialogue features corresponding to a plurality of dialogue replies based on the prior network in the dialogue model;
  decoding the target dialogue feature based on a decoder in the trained dialogue model to generate a target dialogue reply; and
  outputting the target dialogue reply.

18. The non-transitory computer-readable storage medium according to claim 17, wherein acquiring the at least two first dialogue features and the at least two second dialogue features of the first dialogue based on the prior network and the posterior network in the dialogue model comprises:
  respectively encoding, for any of the first dialogue replies of the first dialogue, the first dialogue preceding text and the first dialogue reply based on an encoder of the dialogue model to obtain a first vector of the first dialogue preceding text and a second vector of the first dialogue reply;
  acquiring at least two first dialogue features of the first dialogue, the first dialogue features of the first dialogue being obtained by processing the first vector of the first dialogue preceding text and the second vector of the first dialogue reply through the posterior network; and
  acquiring at least two second dialogue features of the first dialog, the second dialogue features of the first dialogue being obtained by processing the first vector of the first dialogue preceding text and a reply category to which the first dialogue reply belongs through the prior network.

19. The non-transitory computer-readable storage medium according to claim 18, wherein acquiring the at least two first dialogue features of the first dialogue comprises:
  inputting the first vector and the second vector into the posterior network;
  outputting, by the posterior network, a first parameter average and a first parameter variance; and
  acquiring a first dialogue feature according to the first parameter average, the first parameter variance and a first sampling value, wherein the first sampling value is obtained by sampling a standard normal distribution.

20. The non-transitory computer-readable storage medium according to claim 18, wherein acquiring the at least two second dialogue features of the first dialogue comprises:
  determining a target probability distribution according to the first vector and the reply category to which the first dialogue reply belongs, the target probability distribution being a probability distribution corresponding to the reply category in the probability distribution output by the prior network;
  inputting the first vector into the prior network to obtain a second parameter average and a second parameter variance; and
  acquiring a second dialogue feature according to the second parameter average, the second parameter variance and a second sampling value, the second sampling value being obtained by sampling the target probability distribution.

* * * * *